(12) United States Patent
Boghossian et al.

(10) Patent No.: US 9,836,933 B2
(45) Date of Patent: Dec. 5, 2017

(54) DATA PROCESSING APPARATUS TO GENERATE AN ALARM

(75) Inventors: Boghos Boghossian, Wimbledon (GB);
James Black, Wimbledon (GB)

(73) Assignee: IPSOTEK LTD., Wimbledon (GB)

( * ) Notice: Subject to any disclaimer, the term of this patent is extended or adjusted under 35 U.S.C. 154(b) by 636 days.

(21) Appl. No.: 13/595,306

(22) Filed: Aug. 27, 2012

(65) Prior Publication Data

US 2012/0320201 A1 Dec. 20, 2012

Related U.S. Application Data

(62) Division of application No. 12/600,380, filed as application No. PCT/GB2008/001679 on May 15, 2008, now Pat. No. 8,305,441.

(30) Foreign Application Priority Data

May 15, 2007 (GB) .................................. 0709329.7
May 18, 2007 (GB) .................................. 0709620.9

(51) Int. Cl.
*G08B 13/196* (2006.01)
*G06K 9/00* (2006.01)
*H04N 7/18* (2006.01)

(52) U.S. Cl.
CPC ... *G08B 13/19682* (2013.01); *G06K 9/00771* (2013.01); *G08B 13/1961* (2013.01);
(Continued)

(58) Field of Classification Search
CPC ..... G06K 9/00771; G06K 2009/00738; H04N 7/188; G08B 13/19682; G08B 13/19697; G08B 13/1961
See application file for complete search history.

(56) References Cited

U.S. PATENT DOCUMENTS 4,180,816 A * 12/1979 Endo .................. G01S 7/40
342/109
4,772,945 A 9/1988 Tagawa et al.
(Continued)

FOREIGN PATENT DOCUMENTS

CA 2273716 12/1999
EP 1102211 5/2001
(Continued)

OTHER PUBLICATIONS

U.S. Patent and Trademark Office, "Notice of Allowance", "U.S. Appl. No. 13/595,275", May 30, 2013, pp. 1-6.
(Continued)

*Primary Examiner* — Mohammed Jebari
(74) *Attorney, Agent, or Firm* — Fogg & Powers LLC

(57) ABSTRACT

A method of operating a data processing apparatus is provided. The method includes receiving video data; receiving a virtual test signal representative of a location of a virtual object; setting data representing the horizontal and vertical size of the virtual object dependent upon the location of the virtual object; overlaying the received video data with an image of the virtual object at locations determined from the virtual test signal to generate virtual test video data; and analyzing the virtual test video data and generating an alarm signal based on an output signal generated by said analysis.

12 Claims, 22 Drawing Sheets

(52) U.S. Cl.
CPC ....... *G08B 13/19697* (2013.01); *H04N 7/188* (2013.01); *G06K 2009/00738* (2013.01)

(56) References Cited

U.S. PATENT DOCUMENTS

| | | | |
|---|---|---|---|
| 5,091,780 A * | 2/1992 | Pomerleau | G06K 9/00771 348/152 |
| 5,909,548 A | 6/1999 | Klein et al. | |
| 6,069,655 A | 5/2000 | Seeley et al. | |
| 6,259,475 B1 | 7/2001 | Ramachandran et al. | |
| 6,411,328 B1 | 6/2002 | Franke et al. | |
| 6,496,207 B1 | 12/2002 | Matsuda et al. | |
| 6,529,230 B1 | 3/2003 | Chong | |
| 6,628,835 B1 | 9/2003 | Brill et al. | |
| 7,423,658 B1 * | 9/2008 | Uomori | G06T 7/60 345/660 |
| 7,436,887 B2 | 10/2008 | Yeredor et al. | |
| 7,459,685 B2 * | 12/2008 | Ikeda | 250/334 |
| 2002/0005894 A1 | 1/2002 | Foodman et al. | |
| 2002/0067259 A1 | 6/2002 | Fufidio et al. | |
| 2003/0020808 A1 * | 1/2003 | Luke | G06T 7/20 348/47 |
| 2003/0107650 A1 | 6/2003 | Colmenarez et al. | |
| 2003/0214583 A1 | 11/2003 | Sadok | |
| 2003/0215141 A1 | 11/2003 | Zakrzewski et al. | |
| 2004/0080315 A1 * | 4/2004 | Beevor et al. | 324/244 |
| 2004/0161133 A1 | 8/2004 | Elazar et al. | |
| 2004/0189460 A1 | 9/2004 | Heaton et al. | |
| 2004/0240542 A1 | 12/2004 | Yeredor et al. | |
| 2005/0099502 A1 | 5/2005 | Kang | |
| 2005/0162515 A1 * | 7/2005 | Venetianer et al. | 348/143 |
| 2005/0232465 A1 * | 10/2005 | Braune et al. | 382/103 |
| 2006/0028552 A1 | 2/2006 | Aggarwal et al. | |
| 2006/0077253 A1 | 4/2006 | VanRiper et al. | |
| 2006/0107296 A1 | 5/2006 | Mock et al. | |
| 2006/0179463 A1 * | 8/2006 | Chisholm | G08B 13/19656 725/90 |
| 2006/0227237 A1 | 10/2006 | Kienzle et al. | |
| 2007/0013776 A1 * | 1/2007 | Venetianer | G06K 9/00771 348/143 |
| 2007/0182818 A1 * | 8/2007 | Buehler | 348/143 |
| 2007/0200701 A1 | 8/2007 | English et al. | |
| 2008/0309761 A1 | 12/2008 | Kienzle et al. | |
| 2009/0073034 A1 * | 3/2009 | Lin | 342/357.07 |
| 2009/0315712 A1 * | 12/2009 | Bloemendaal et al. | 340/541 |
| 2010/0002082 A1 * | 1/2010 | Buehler et al. | 348/159 |

FOREIGN PATENT DOCUMENTS

| | | |
|---|---|---|
| EP | 1363256 | 11/2003 |
| EP | 1376510 | 1/2004 |
| EP | 1398744 | 3/2004 |
| EP | 1498849 | 1/2005 |
| GB | 2323731 | 9/1998 |
| GB | 2359883 | 9/2001 |
| GB | 2427319 | 12/2006 |
| JP | 05018748 | 1/1993 |
| JP | 05153468 | 6/1993 |
| JP | 2004030022 | 1/2004 |
| JP | 2006311111 | 11/2006 |
| KR | 100765047 | 4/2006 |
| WO | 9708896 | 3/1997 |
| WO | 2004066209 | 8/2004 |
| WO | 2006075352 | 7/2006 |
| WO | 2006105286 | 10/2006 |
| WO | 2007002763 | 1/2007 |

OTHER PUBLICATIONS

Boghossian et al., "Motion-Based Machine Vision Techniques for the Management of Large Crowds", "IEEE 6th International Conference on Electronics, Circuits and Systems", Sep. 5-8, 1999, pp. 961-964.

Boghossian et al., "Evaluation of Motion-Based Algorithms for Automated Crowd Management", "Workshop on Performance Characterisation and Benchmarking of Vision Systems", Jan. 1999, pp. 80-96, Publisher: International Conference on Vision Systems, Published in: Spain.

Boghossian et al., "Image Processing System for Pedestrian Monitoring Using Neutral Classification of Normal Motion Patterns", "Measurement and Control (Special Issue on Intelligent Vision Systems)", 1999, pp. 261-264, vol. 32.

Velastin et al., "A Motion-Based Image Processing System for Detecting Potentially Dangerous Situations in Underground Railway Stations", "Transportation Research. Part C, Emerging Technologies", Mar. 2006, pp. 96-113, vol. 14, No. 2.

Velastin et al., "Prismatica: Toward Ambient Intelligence in Public Transportation Environments", "Good Practice for the Management and Operation of Town Centre CCTV. European Conf. on Security and Detection", Jan. 2005, pp. 164-182.

U.S. Patent and Trademark Office, "Notice of Allowance", "U.S. Appl. No. 12/600,380", Aug. 31, 2012, pp. 1-8.

U.S. Patent and Trademark Office, "Office Action", "U.S. Appl. No. 12/600,380", May 25, 2012, pp. 1-15.

International Searching Authority, "International Search Report and Written Opinion", "from Foreign Counterpart of U.S. Appl. No. 12/600,380", May 15, 2008, pp. 1-17, Published in: WO.

U.S. Patent and Trademark Office, "Office Action: Ex Parte Quayle", "U.S. Appl. No. 13/595,275", Apr. 1, 2013, pp. 1-18.

European Patent Office, "Extended European Search Report from EP Application No. 15020254.7 dated Nov. 16, 2016", "from Foreign Counterpart of U.S. Appl. No. 13/595,275", Nov. 16, 2016, pp. 1-8.

* cited by examiner

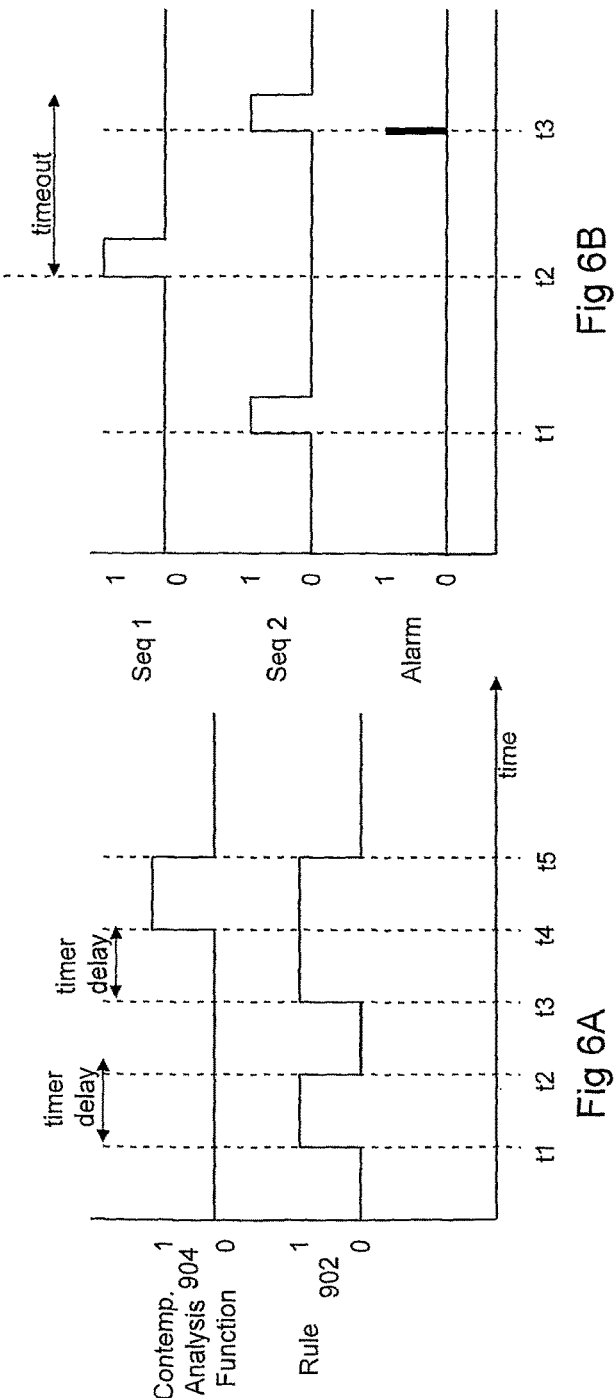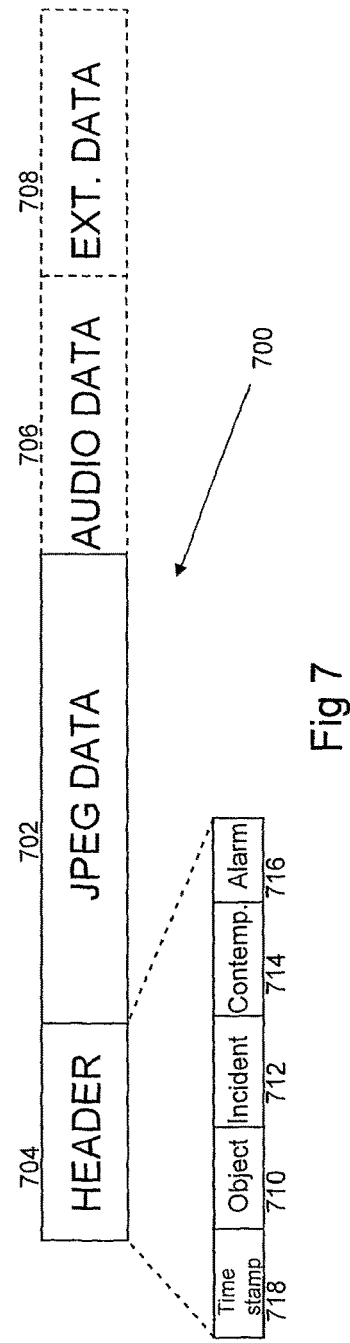
Fig 6A
Fig 6B
Fig 7

DATA PROCESSING APPARATUS TO GENERATE AN ALARM

CROSS-REFERENCE TO RELATED APPLICATIONS

This application is a divisional application of U.S. application Ser. No. 12/600,380, filed on Nov. 16, 2009, now issued as U.S. Pat. No. 8,305,441 on Nov. 6, 2012, which, in turn, claims priority to International Patent Application No. PCT/GB/2008/001679 filed on May 15, 2008, which claims priority to Patent Application Nos. 0709329.7 filed on May 15, 2007 and 0709620.9 filed on May 18, 2007.

BACKGROUND

The present disclosure relates to data processing apparatus, in particular, but not exclusively, to a data processing apparatus that is configured to generate an alarm signal as a result of analysis performed on received audio and video data signals.

Closed circuit television (CCTV) systems are known to record video data, and display the video data to a human operator in order that the human operator can identify any anomalies in the video data, for example breaches of security, or illegal activities.

US 2006/0222206 (Garoutte) discloses a methodology of implementing complex behaviour recognition in an intelligent video system.

U.S. Pat. No. 6,628,835 (Brill et al) discloses a method and system for defining and recognizing complex events in a video sequence.

WO 97/08896 (Scientific-Atlanta, Inc.) discloses an open area security system that comprises an acoustic sensor array capable of forming elevational and azimuthal beans, and a camera mounted in the vicinity of the array that is automatically directed toward a detected, sound-producing event.

Aspects and embodiments disclosed herein were devised with the foregoing in mind.

SUMMARY

According to a first aspect of the invention, there is provided data processing apparatus comprising:
 a video data receiver configured to receive video data; and/or
 an audio data receiver configured to receive audio data; and
 an alarm engine configured to analyse said received video and/or audio data and generate an alarm signal based on an output signal generated by said analysis.

According to a second aspect of the invention, there is provided a method of operating a data processing apparatus comprising:
 receiving video data; and/or
 receiving audio data; and
 analysing said received video and/or audio data and generating an alarm signal based on an output signal generated by said analysis.

The analysis may comprise one or more processing operations that perform an analysis of the received data and may be based on computations based on physical modelling to identify incidents from the received data.

The result of the analysis may be a binary output, for example whether or not one or more criteria are satisfied, or may be an output signal that represents a degree to which one or more criteria are met, or may be a count of how many times a criteria is met. In some embodiments, the analysis may be referred to as analytics; that is a logical analysis such as the application of algorithms and transformations that operate on a digital representation of the received data.

An example of a count of how many times a criteria is met may include how many times an object, for example a person or a vehicle, passes a predetermined point. That is, a criterion may be a person passing a predetermined point. The predetermined point may be an entry to a building, a field, an arena, or any other area.

In one embodiment, a video camera may be set up to monitor a doorway to a building, and the results of analysis performed on the video data may be a count of the number of people who have passed through the doorway, and/or the total number people who are currently inside the building. In order to maintain a count of the total number of people inside the building the video analysis may be able to differentiate between people entering and exiting the building.

In other embodiments, the predetermined area may be a gate to a field/enclosure, an entrance to a stadium, an entrance to a public transport station such as a train station, or any other area through which objects/people pass.

Generating the alarm signal as a result of analysis performed on both the received audio and video data can enable complex alarm monitoring incidents/scenarios to be considered and/or detection accuracy to be improved and/or the number of false alarms generated to be reduced.

The analysis may be performed on both the audio and video data, either independently or in combination, or in sequence, and this can enable a greater degree of confidence to be placed on alarms.

In some embodiments, incidents that can be determined from a result of analysis of audio data complement incidents that can be determined from a result of analysis of video data due to the different types of incident that each type of data are particularly suited to monitoring.

For example, analysis of video data may provide high detection accuracy and low false alarm potential for determining an "Intruder Detection" incident, whereas analysis of audio data may provide low detection accuracy and high false alarm potential for determining the same "Intruder Detection" incident. Similarly, analysis of video data may provide low detection accuracy and high false alarm potential for determining a "Personal Attack" incident, whereas analysis of audio data may provide high detection accuracy and low false alarm potential for determining the same "Personal Attack" incident. However, using a combination of analysis of both video and audio data enables a high detection accuracy and low false alarm potential to be obtained for both the "Intruder Detection" incident and the "Personal Attack" incident.

An example where use of analysis of audio and video data together can improve detection accuracy and false alarm potential includes identifying a shooting. Use of audio data analysis alone may wrongly identify a car back-firing as a gunshot, and use of video data analysis alone may wrongly identify a person running for a bus as running away from a shooting. However, use of audio and video data analysis together can ensure that a shooting alarm is only generated when a gunshot sound is identified and it is determined that people are running in the scene.

It will be appreciated that embodiments of the invention provide a system/method wherein the analysis of audio data can be used to complement any deficiencies in an analysis of video data, and vice versa. This provides an improved system/method for automatically generating alarms that are determined as a result of an improved determination of incidents/scenarios from the received data.

Furthermore, it may be possible to determine the occurrence of alarms that previously were not determinable. For example, security threats and potentially dangerous situations can be determined early by utilising the more sophisticated incidents/scenarios that can be recognised to enable preventative pro-active measures to be taken where possible. This may be preferable to re-active measures that are taken after a dangerous situation has occurred.

The alarm engine may be configured to:

perform incident analysis on said received audio and/or video data, and generate an incident analysis output signal, wherein said incident analysis output signal comprises a representation of the result of one or more pattern recognition operations performed on said received audio and/or video data.

The one or more pattern recognition operations may comprise identifying objects from the video data. Examples of objects in the video data may comprise components of the foreground of a video image, for example a person, a bag, or a vehicle. The incident analysis may comprise performing one or more pattern recognition operations on one or more objects identified from the video data. The pattern recognition operations may comprise determining spatial and/or temporal relationships of objects identified in the video data.

The one or more pattern recognition operations may comprise applying pattern recognition operations to the audio data. For example, the audio pattern recognition operations may comprise one or more of performing ridge estimation, running autocorrelation operations under the ridges to provide a measure of the periodicity of contours, performing instantaneous frequency estimation to determine a local frequency for each moment of the fundamental period contour, performing fundamental period contour estimation to estimate the pitch of the signal.

Performing one or more comparisons of said received audio and video data with one or more patterns enables situations comprising different types of incidents to be determined. Examples of incidents include identifying a stationary object, loitering, congestion, running, a gun shot, aggressive noise, an emergency vehicle's siren, and a scream. The pattern recognition operations on the received audio and video data may be performed independently, in combination, or in sequence.

The video incident analysis may be performed on a detection area that comprises a sub-area of said video data.

Use of the detection area enables more advanced incidents to be determined as the incident analysis is focussed on areas of interest. This level of refinement can enable events which would otherwise have constituted an incident to be ignored if they are not within the detection area. The detection area may comprise one or more sub-areas of images represented by the video data, and the sub-areas may or may not be contiguous. For example, sub-areas may be defined that correspond to areas of an image that display doors and windows when performing security analysis.

One or more of the sub-areas may be dynamically determined. A dynamically determined sub-area may focus/restrict analysis, or a function defined by said analysis, to a sub-area related to an earlier incident as identified by the incident analysis. The dynamically determined sub-area may be a sub-area of a detection area, which in turn may be a sub-area of an existing sub-area.

The alarm engine may be configured to:

perform contemporaneous analysis on said received audio and/or video data, and generate a contemporaneous analysis output signal, wherein said contemporaneous analysis output signal comprises a representation of the result of one or more contemporaneous analysis functions applied either directly or indirectly to the received audio and/or video data.

A contemporaneous analysis function is a function of the contemporaneous analysis.

One or more of said contemporaneous analysis functions may comprise a contemporaneous analysis rule and a delay period. The delay period defines a period of time for which the contemporaneous analysis rule must be satisfied for the contemporaneous analysis function to be satisfied. The contemporaneous analysis rule may comprise an operation that is to be performed on one or more incident analysis output signals, and the operation may be a Boolean operation.

Using a delay period enables the analysis to generate an alarm when criteria are satisfied for a predetermined time. This provides the advantage that potential false alarms that would be generated where a criteria is satisfied for only a short period of time are reduced. Another advantage is that a user defined delay that is appropriate to a behaviour/incident that is being monitored can be incorporated. Furthermore, additional confidence can be provided by automatically utilising the determination of the concurrence of audio and video incidents/detections.

The alarm engine may be configured to:

perform sequential analysis either directly or indirectly on the received audio and/or video data, and generate a sequential analysis output signal, wherein said sequential analysis comprises the sequential application of one or more sequential analysis functions to the received audio and/or video data, wherein said sequential analysis output signal comprises a representation of the result of the last of the one or more sequential analysis functions.

In embodiments where there is one sequential analysis function, the only sequential analysis function is the last sequential analysis function. That is, the sequence is a sequence of one function.

In embodiments where the one or more sequential analysis functions comprise a plurality of sequential analysis functions, one or more of the plurality of sequential analysis functions may comprise a sequential analysis rule and a timeout period. The timeout period may define a period of time after the sequential analysis rule has been satisfied during which the output signal for that sequential analysis function is considered true. That is, the timeout period defines a period of time during which the next sequential analysis function must be satisfied for the sequence to be continued. If the next sequential function is not satisfied before the timeout period of the previous sequential function expires, then the alarm engine may be configured to terminate the processing of the current sequence. In the meantime, any further sequences that have been initiated are continued.

The timeout period for a sequential analysis function may be applied from the time at which the sequential analysis rule of that sequential analysis function is satisfied. In such an embodiment, the timeout period timer is triggered when the sequential analysis rule is satisfied, and therefore the output of the sequential analysis function is true for the period of time defined by the timeout period after the sequential analysis rule becomes satisfied.

In other embodiments, the timeout period may be applied from the time at which the sequential analysis function is no longer satisfied. That is, the output of the sequential analysis function is true for the period of time during which the sequential analysis rule is satisfied plus the period of time defined by the timeout period after the sequential analysis rule is no longer satisfied.

One or more of the sequential analysis rules may comprise an operation that is to be performed on the contemporaneous analysis output signal. The operation may be a Boolean function.

The video data may be data representative of output signals generated by a plurality of cameras. The audio data may be data representative of output signals generated by a plurality of microphones.

The audio data may be representative of sound emanating from outside of the field of the received video data. This can provide the advantage that alarms can be generated in relation to situations where the cameras do not necessarily capture the situation for which the alarm is generated and/or where incidents outside the field of view for the received video data assist in determining what incidents are occurring in the field of view.

The data apparatus may further comprise an external data receiver configured to receive external data, wherein the alarm engine is also configured to perform analysis on said received external data. Examples of external data may include data representative of an indication of smoke, fire or an intruder, and the data may be received from a smoke alarm, a temperature sensor or an infra-red motion detector.

In other embodiments, the external data receiver may be configured to receive data from a radio frequency identification (RFID) system. For example, the external data received from an RFID system may comprise a count of the number of RFID tags/transponders that are identified by a RFID reader.

The RFID reader may be one wire that runs under the ground across an entrance to an area such as a building, wherein a count is incremented each time a RFID tag passes over the wire.

In some embodiments, the RFID reader may be two wires that run under the ground across an entrance, wherein the wires are spaced apart such that an incident analysis function can determine in which direction the RFID tag is passing through the entrance. The wires/RFID readers may be spaced 1 meter apart across the entrance. This can be determined by identifying in which order the two RFID readers/wires were activated by a given RFID tag. By monitoring in which direction RFID tags pass by the reader, it may be possible to maintain a count of the total number of RFID tags that are within a building or any other area. For example a count may be incremented when a tag passes through the entrance in one direction, and the count may be decremented when a tag passes through the entrance in the other direction.

In some embodiments, the alarm engine may be configured to perform analysis on the external data to perform a comparison between the external data and video and/or audio data. A discrepancy between the external data and the video and/or audio data may cause an alarm signal to be generated by the alarm engine.

An embodiment where external data representative of a count of the number of people who pass through an entrance is compared with video data representative of a count of the number people passing though the same entrance may be considered as a "covert access control system". The external data may be obtained from an RFID system, for example. It will be appreciated that such a "covert access control system" is not limited to monitoring people entering a building, but could be used as a barrier-less entry control system in any situation where crowd flow, or any other object flow such as vehicles, can be monitored.

Another embodiment where external data representative of a count of the number of people who pass through an entrance is compared with video data representative of a count of the number people passing though the same entrance can be used to detect "tailgating" possibly through ticket barriers or at an access control point at a security door that is opened by the swiping of a security pass.

An example of tailgating is where two or more people pass through an automated ticket barrier using a ticket that is only valid for a single person. Typically this may mean two people walking very closely together through a ticket barrier that automatically opens when a ticket is presented, for example at a train station. In some embodiments, the ticket barrier may accept paper tickets, and in other embodiments the ticket barrier may be configured as an RFID reader to access data on an RFID tag associated with a ticket.

Optionally, embodiments described herein may be used with systems that do not have a physical barrier to access. In such an embodiment, the external data may comprise data representative of the covert reading of RFID tags as they pass through an area that is monitored by a RFID reader. The monitored area may be considered as comprising a "virtual trip wire" which can generate an external data output signal when the presence of a RFID tag is determined. The external data output signal may be a count of the number of RFID tags passing through the monitored area in a predetermined time. The alarm engine may be configured to compare a count of the number of RFID tags passing through the monitored area as determined from the external data output signal, with a count of objects passing through the monitored area as determined from a video data signal.

According to a further embodiment of the invention, there is provided a method of configuring data processing apparatus for automatically determining a real size of an object in an image of a scene displayed on a display screen, the method comprising:

responding to user input by displaying in an image of a scene displayed on a display screen a virtual object representative of a real size object to establish a first datum position;

varying the size of the virtual object in the image responsive to user input;

storing data representative of the horizontal and vertical size of the virtual object relative to the displayed image at the first datum position;

displaying said virtual object at a second datum position in said image responsive to user input;

varying the size of the virtual object on the display screen at the second datum position responsive to user input; and storing data representative of the vertical and horizontal size of the virtual object at the second datum position relative to the displayed image.

According to a further embodiment of the invention, there is provided data processing apparatus configured for automatically determining a real size of an object in an image of a scene displayed on a display screen, the apparatus operative to:

respond to user input by displaying in an image of a scene displayed on a display screen a virtual object representative of a real size object to establish a first datum position;

vary the size of the virtual object in the image responsive to user input;

store data representative of the horizontal and vertical size of the virtual object relative to the displayed image at the first datum position;

display said virtual object at a second datum position in said image responsive to user input;

vary the size of the virtual object on the display screen at the second datum position responsive to user input; and store data representative of the vertical and horizontal size of the virtual object at the second datum position relative to the displayed image.

The method may further comprise automatically establishing said first datum position by displaying said virtual object such that the foot of the virtual object is at the foot of said displayed image.

The method may further comprise automatically establishing said second datum position by displaying said virtual object such that the foot of the virtual object is on the horizon of the scene in the displayed image.

The method may further comprise storing data representative of the real size represented by said virtual object.

This may provide the advantage that the user can define the real size represented by the virtual object, for example to suit the sizes of the objects in the image.

According to a further aspect of the invention, they may be provided data processing apparatus comprising:

a video data receiver configured to receive video data;

a virtual test signal receiver configured to receive a virtual test signal representative of a location of a virtual object;

a video overlay engine configured to overlay the received video data with a virtual object at locations determined from the virtual test signal to generate virtual test video data; and an alarm engine configured to analyse the virtual test video data and generate an alarm signal based on an output signal generated by said analysis.

The video overlay engine may be configured to set the size of the virtual object dependent upon the location of the virtual object.

The received video data may be pre-recorded video data retrieved from computer memory, or may be live video data.

The virtual object may representative of an object that has been captured from video data, or may be a virtual object that has been loaded from a library of virtual objects.

According to a further embodiment of the invention, there is provided data processing apparatus comprising:

a video data receiver configured to receive video data;

an external data receiver configured to receive external data; and an alarm engine configured to analyse said received video and external data and generate an alarm signal based on an output signal generated by said analysis.

According to a further embodiment of the invention, there is provided a method of operating a data processing apparatus comprising:

receiving video data;

receiving external data; and analysing said received video and external data and generating an alarm signal based on an output signal generated by said analysis.

The alarm engine may be configured to perform sequential analysis of said received video and external data to determine a sequence of one or more incidents.

The external data may be received from, and representative of the data output by, one or more of: an RFID system; a thermal camera; a fingerprint reader; an iris reader; an access card reader; an automatic number plate recognition system; a fire alarm; an access control system; a speed camera; a relay input; a keypad entry system; a thermal sensor; an ear shape detection system; a face recognition system; an object tracker system; a smoke detector; a voice identification (speaker identification) system; a voice recognition system; a gait detection (identification) system; a temperature measuring system; an infrared or radio frequency remote control system/signal; a radar; a proximity detection system; an odour detector; an electrical fence intruder detection system; and/or a sonar system.

DRAWINGS

Specific embodiments in accordance with the present invention will now be described, by way of example only, with reference to the drawings, in which:

FIG. 6 shows an example of timing diagrams according to an embodiment of the invention;

FIG. 7 shows an embodiment of an image file according to an embodiment of the invention;

DETAILED DESCRIPTION

Figure 1:
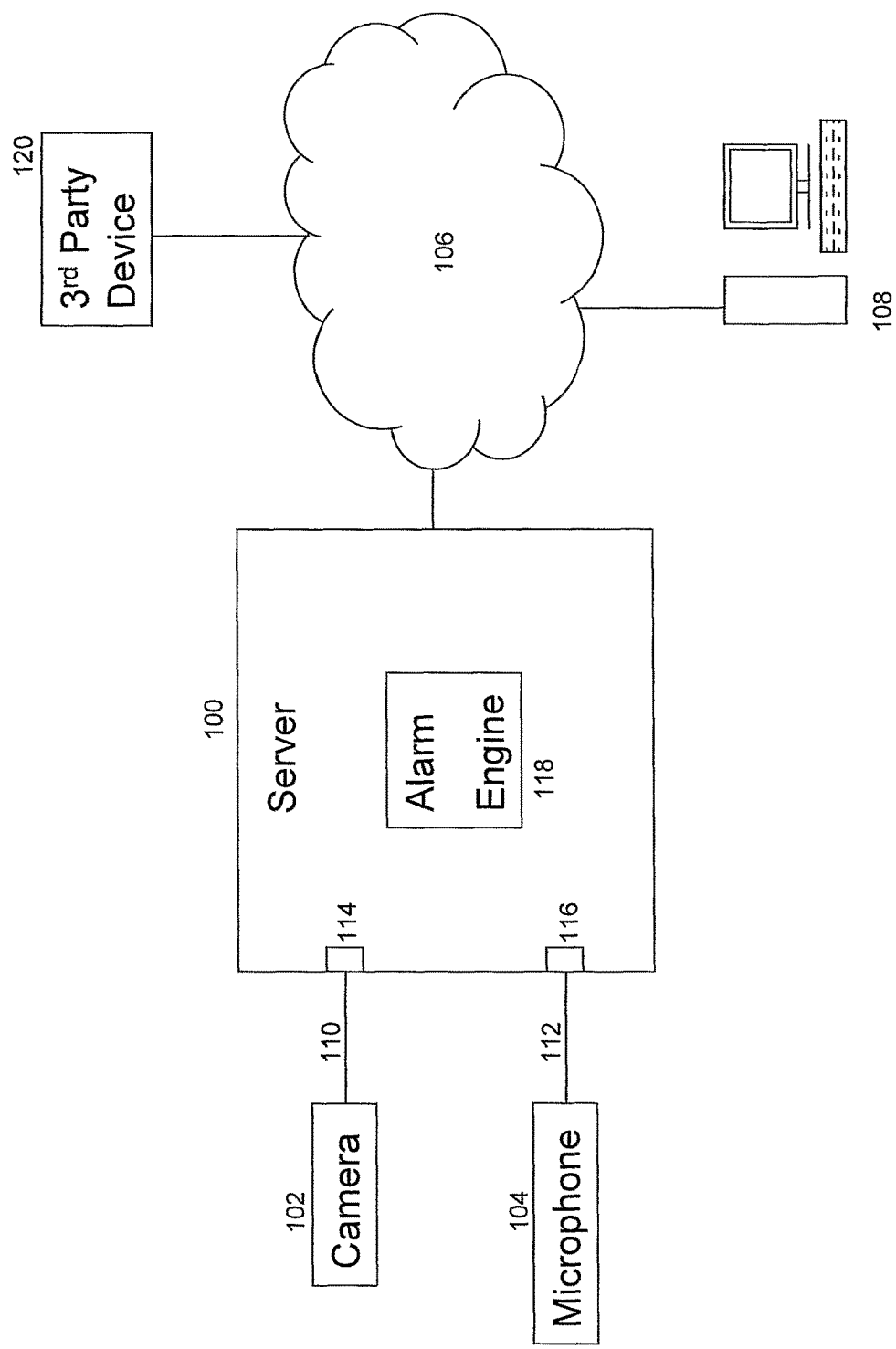
FIG. 1 shows a system according to an embodiment of the invention.

FIG. 1 shows a system according to an embodiment of the invention for generating an alarm based on the result of analysis of received audio and video data.

In this embodiment, the analysis utilises algorithms and transformations applied to the received data in order to detect incidents that are modelled on physical parameters/characteristics. Detecting incidents may include performing pattern recognition operations on the received data, and such an analysis may be referred to as analytics.

The system comprises data processing apparatus, which in this embodiment is a server 100, a camera 102, a microphone 104, a user terminal 108 and a third party device 120.

The server 100 is in electronic communication with the camera 102 and the microphone 104 over communications links 110, 112 respectively, and is in communication with the user terminal 108 and third party device 120 over network 106.

The camera 102 is an analogue camera configured to generate analogue video data and make the analogue video data available to the server 100 over the electronic communications link 110. Similarly, the microphone 104 is configured to generate analogue audio data and make the analogue audio data available to the server 100 over electronic communications link 112.

In this embodiment, the server 100 converts the analogue audio and video data into digital data for subsequent processing, although it will be appreciated that in other embodiments a digital camera and/or digital microphone may be used to generate digital video and/or audio data and make the digital data available to the server such that analogue to digital conversion is not required at the server 100.

In this embodiment, the server 100, camera 102, and microphone 104 are all located in the same geographical area, for example in a building that is being monitored, and therefore the communication links 110, 112 are hard-wired.

The server 100 comprises a video data receiver 114 configured to receive video data from the camera 102 and an audio data receiver 116 configured to receive audio data from the microphone 104. The server 100 also comprises an alarm engine 118 configured to perform analysis on both the received audio and video data, and generate an alarm based on the result of the analysis.

Typically an alarm is generated to identify a security threat, an illegal action, or to identify a potentially unsafe situation such as detecting congestion on a train platform. The server 100 may automatically take a predetermined action when an alarm is generated. The predetermined action that is taken may depend upon a priority associated with the alarm. The predetermined action may include transmitting a signal to the user terminal 108 indicative of the alarm, thereby reporting the alarm to a human operator of the user terminal 108.

The server 100 may also be configured to record/write data in relation to the analysis to memory. The recorded data may be associated with the video and/or audio data to which the analysis has been applied. In some embodiments, the data may be written/recorded by appending a header to the received video and/or audio data, wherein the header contains a representation of the results of the analysis.

Non-limiting examples of analysis that may be performed on video data include detecting a stationary object, tracking an object, detecting motion of an object in a predefined direction, detecting loitering, and any combination thereof. Non-limiting examples of analysis that may be performed on audio data include identifying sounds that relate to aggression, breaking glass, a gunshot, a scream, and any combination thereof. Individual analysis operations performed on the audio and/or video data may be combined such that a plurality of analysis operations can be considered independently, and/or contemporaneously and/or sequentially in order to generate an alarm signal. Further details of examples of analysis are described in more detail below.

Generating the alarm signal as a result of analysis performed on both the received audio and video data enables sophisticated alarm monitoring scenarios to be considered with a high level of detection accuracy and may also reduce the number of false alarms generated. The results of the analysis on both the audio and video data, either independently or in combination may enable a greater degree of confidence to be placed on alarms that are generated.

The server 100 is also in communication with the user terminal 108 and the third party device 120 over a network 106. In this embodiment, the network 106 is an IP network such as a Local Area Network (LAN) and a user of the user terminal 108 can use a graphical user interface (GUI) displayed by Web browser software stored on the user terminal 108 to manage and display alarm signals generated by the alarm engine 118 in the server 100.

In other embodiments, the network may be a Wide Area Network (WAN), a Metropolitan Area Network (MAN) or the Internet.

In this embodiment, the user must log in to use the GUI. Each user has an associated electronic user profile file that defines the privileges of that user. Depending upon the privileges of the user profile that is logged in, the Web browser software is configured to control the functionality that is available to the user. For example, a manager may have access to a GUI that is arranged to configure and manage alarms, whereas an operator may only have access to a GUI that is arranged to manage alarms.

The third party device 120 is associated with a third party who has registered to receive alarm information from the server 100. The server 100 is configured to be in client-server communication with the third party device 120 such that the third party device 120 is the server, and the alarm server 100 is the client.

The third party device 120 is configured to receive alarm signals from the server 100 and in this embodiment the third party device 120 is not arranged to configure how the alarm signals are generated. The configuration of how the alarm files are generated is provided at user terminal 108.

It will be appreciated that the functionality of the server/data processing apparatus 100 may be provided by a single device in a single location, or alternatively may be distributed over a number of devices which may be in one or more different locations, for example distributed over multiple servers.

It will be appreciated that in some embodiments there may be provided a plurality of cameras 102 and/or a plurality of microphones 104, and that analysis is performed on video and audio data received from one or more of the cameras 102 and microphones 104.

Figure 2:
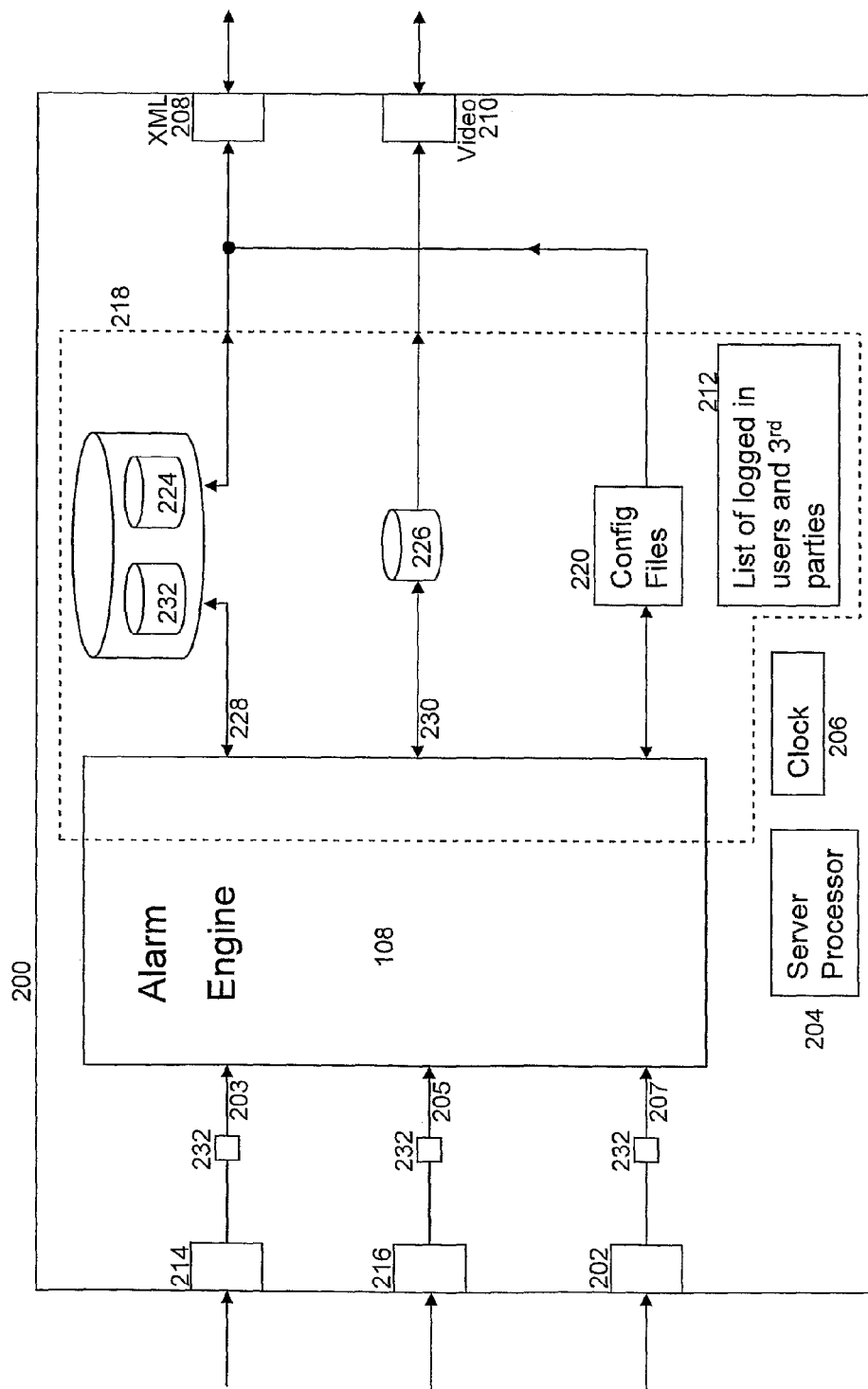
FIG. 2 shows an embodiment of a data-processing apparatus according to an embodiment of the invention.

FIG. 2 shows another embodiment of a data processing apparatus 200 according to the invention.

The data processing apparatus is a server 200 that comprises a video data receiver 214, an audio data receiver 216, an external data receiver 202, an XML transmitter/receiver 208 and a video transmitter 210. The server comprises a server processor 204, a clock 206 and memory 218. In this embodiment part of the functionality provided by the alarm engine 108 is stored as software modules in memory 218, and part of the functionality of the alarm engine 108 is provided by designated processors as discussed in more detail in relation to FIG. 3. Memory 218 also comprises a video storage data store 226, a plurality of databases 224, a list of logged-in users 212 and one or more configuration files 220.

In addition to the audio and video data receivers that are present in the data processing apparatus 100 illustrated in FIG. 1, the data processing apparatus 200 illustrated in FIG. 2 is configured to also receive external data at external data receiver 202. External data is data received from an external data source/sensor, and is representative of a physical quantity such as temperature, the presence of smoke, motion detection for example through use of an infra red beam, or the activation of an external relay.

The server 200 comprises three analogue to digital converters 232, which are configured to convert the analogue video, audio and external data received at data receivers 214, 216, 218 and provide corresponding digital data 203, 205, 207 to the alarm engine 108. In this embodiment, the analogue to digital converters 232 are configured to sample the analogue signals at a sampling frequency of 5 Hz. That is, a digital representation of the analogue data is generated every 0.2 seconds.

The alarm engine 108 is configured to process/analyse the received audio, video and external data and generate an alarm message when an alarm is generated/triggered as determined from the analysis. Specifically, the alarm engine 108 is configured to apply one or more analysis functions as defined by a user of user terminal 208 to one or more of the received audio, video data, and external data, and to use the result of the one or more analysis functions to determine whether or not an alarm message should be generated.

A user can use a GUI accessible from the user terminal 108 in communication with the XML transceiver 208 on the server 200 to configure the analysis that is to be performed on the received data by the server 200 to generate an alarm. The GUI is arranged to enable the user to create a configuration file that defines the analysis functions that are to be performed on the received data, and define when that configuration file is to be applied. The user can select the analysis functions that are to be performed from a preset list of analysis functions. In response to the user's input, the GUI generates a configuration signal representative of the user's input and the user terminal 108 sends that signal to the XML receiver 208 of the server 200.

The configuration signal defines an identifier for the configuration file, identifiers of one or more analysis functions, the parameters associated with those analysis functions, and the times at which the configuration file is to be applied. The parameters include a data source identifier (for example, a camera or microphone name/identifier) to which the analysis function should be applied. In this example, a week is split into 30 minute timeslots and the signal represents which of the 30 minute timeslots in a week the configuration file is to be applied.

Upon receipt of the configuration signal, the server 200 is configured to store a configuration file in data store 220 and populate the scheduler database 224 to define when the configuration file is to be applied.

The configuration file comprises the configuration identifier, the identifiers of the one or more analysis functions, and the parameters associated with those analysis functions as determined from the received configuration signal. The configuration file is used by the alarm engine 108 to define which analysis functions are performed on the received data, the values that are to be attributed as the parameters for those analysis functions, and how those functions are logically connected together.

In addition, the server 200 populates the scheduler database 224 upon receipt of the configuration signal to define at what times the corresponding configuration file is to be applied. The scheduler database 224 comprises a row for each timeslot, and each row comprises two columns: a first that represents a timeslot identifier and a second that represents a configuration file identifier. The server is configured to populate the scheduler database 224 by inserting the configuration file identifier into the rows corresponding to the timeslots to which the user has applied the configuration. In this example the scheduler database 224 comprises 336 rows (48×7), one for each 30 minute timeslot in a week.

In this embodiment, the server 200 only enables a single configuration file to be applied at a given time, although in other embodiments a plurality of configuration files may be applied to the same timeslot, and therefore more than one configuration file identifier may be associated with a single timeslot identifier in the scheduler database 224.

During operation, the alarm engine 108 is configured to use the time provided by the clock 206 to poll the scheduler database 224 every 30 minutes, and if the alarm engine 108 determines that a different configuration file is to be applied for the new timeslot, the alarm engine 108 loads the appropriate configuration file from configuration files data store 220 into alarm engine 108. The alarm engine is preloaded with the functionality to perform the available analysis functions. The analysis function identifiers in the configuration file provide an identification of which of the preloaded analysis functions to enable.

The alarm engine 108 is configured to apply the analysis functions as identified by the analysis function identifiers, and apply algorithms that determine whether or not an alarm message should be generated based on the results of the analysis functions.

When an alarm message is generated, it is sent from the alarm engine 108 to alarms database 232 where an entry is made that corresponds to the generated alarm. In addition, the alarm message is sent to XML transmitter 208, which is configured to send the alarm message to all user terminals 108 that are logged on to the server 200 and one or more third party servers 120. The destinations to which the alarm message are sent are determined from the list of logged on users and a third party servers 212 (if there are any) the addresses of which are stored in memory 218.

The alarm message includes an identifier of the alarm, one or more of the results of the analysis that lead to the generation of the alarm, and a timestamp. The timestamp may be used to retrieve video and/or audio and/or external data from data store 226 relative to the time at which the alarm was generated, for example for the ten seconds before and ten seconds after an alarm is generated.

The alarm message may also comprise information relating to the data source that provided the data that caused the alarm to be generated, for example one or more camera identifiers, and/or one or more microphone identifiers and/or one or more external data source identifiers. The results of the analysis may also comprise coordinates of objects within an image that caused the alarm to be generated, for example when an alarm is configured to identify a stationary vehicle, the coordinates of the identified stationary vehicle in the image may be provided.

In addition to the generation of alarms, the alarm engine 108 generates an image file periodically five times every second that corresponds to a snapshot image of the video data received from a camera. The alarm engine 108 is configured to append supplemental data representative of the analysis performed on the image to each image file. In this embodiment, the data is appended in the form of a header that provides a timestamp as well as the data representative of the analysis performed on the image.

The data representative of the analysis performed on the image provides information in relation to characteristics of the associated video data, the results of the one or more of the analysis functions that have been performed on the received data, and an alarm indicator if the analysis has caused an alarm to be generated. The data representative of the analysis performed on the image may include characteristics of objects that are identified in the image. An object in the video data may comprise a component of the foreground of a video image, for example a person, a bag, or a vehicle.

The appended image files are stored in memory 218 in the data store 226.

In other embodiments, the image files may also be appended with a representation of the corresponding audio and/or external data including the results of one or more analysis functions that have been applied to the audio and/or external data. This can enable video, audio and/or external data to be retrieved from data store 226 along with the information provided by the associated header, for a given time frame.

The information provided in the header can enable further analysis operations to be performed on the results of the analysis that has already been performed on the received data as recorded in the appended header. For example, where the analysis that has been performed on the received data consists of a number of layers/tiers of analysis functions, the results of the first tier of analysis can be retroactively processed in a different way to the analysis that was performed on the results of the first tier (incident) analysis data when it was originally received.

Figure 3:
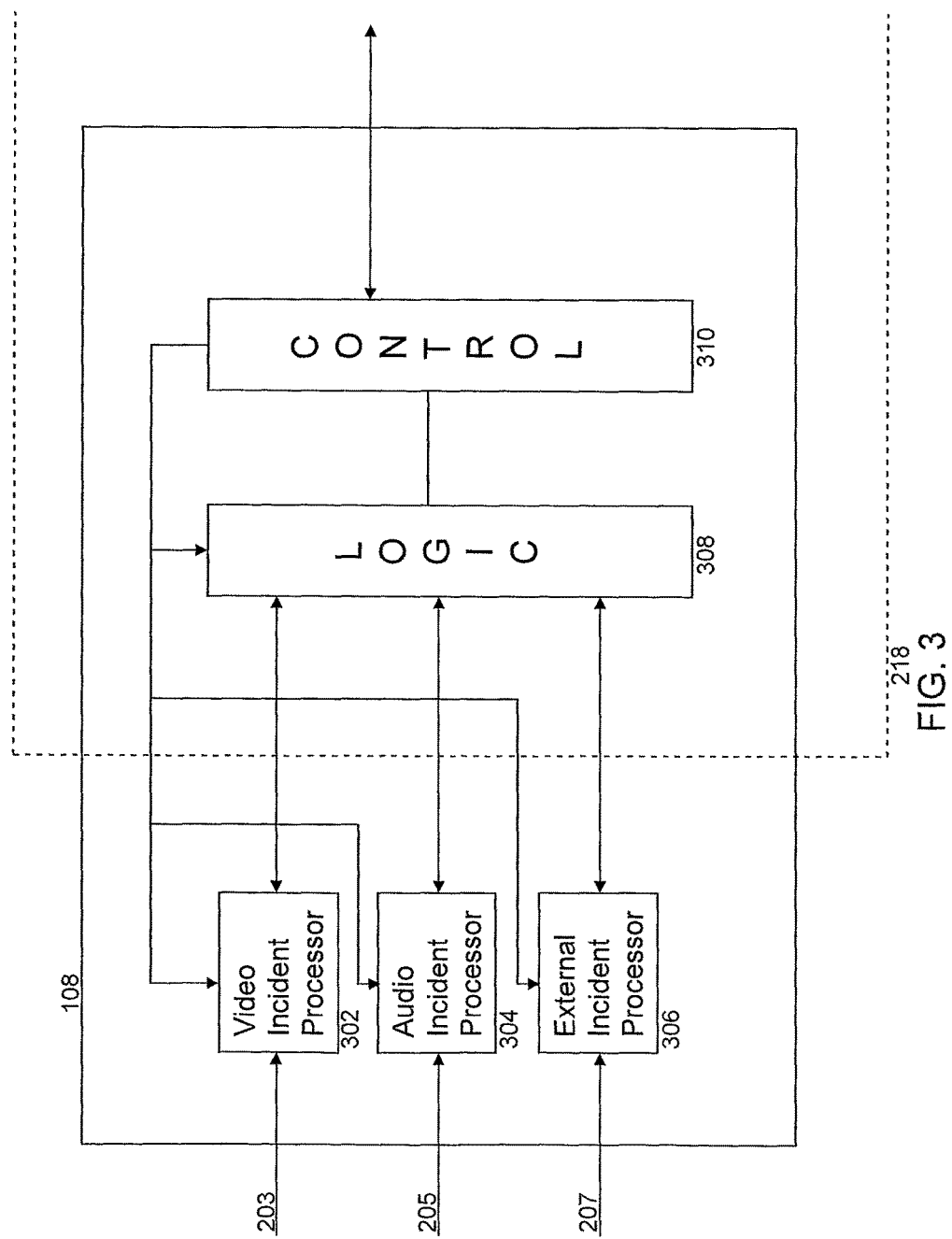
FIG. 3 shows an embodiment of an alarm engine according to an embodiment of the invention.

FIG. 3 shows another embodiment of an alarm engine 108 according to the invention. The alarm engine 108 comprises a video incident processor 302, an audio incident processor 304, an external incident processor 306, a logic unit 308, and a control unit 310. The logic unit 308 and the control unit 310 are software modules stored in memory 218. The video incident processor 302, audio incident processor 304, and external incident processor 306 are designated digital signal processors.

The video incident processor 302, audio incident processor 304, and external incident processor 306 are configured to perform computationally intensive incident analysis functions on the received data, and therefore it is efficient for designated digital signal processors to perform this computationally intensive analysis. The implementation of the incident analysis functions in software may place an unacceptably high burden on a single processor 204 within the server. However, in other embodiments, a single processing resource may be capable of performing the incident analysis processing without detracting from the overall performance of the alarm engine 108. In one embodiment all of the processing may be performed on a single processor located on the server.

Each of the incident processors 203, 205, 207 is preloaded with one or more incident analysis functions which can be set as disabled or enabled depending on the user defined configuration that is to be applied. The incident analysis functions that are used by a configuration file are enabled and configured with the required parameters in the incident processors 302, 304, 306 by control unit 310.

An example of a video incident analysis function is one that determines a stationary object. The function is configured to initially detect the background of an image by applying a mixture of Gaussians to model the scene background. This step may be performed over a period of time to provide a suitable level of confidence that the background has been properly detected, and therefore provide confidence that any differences between a subsequent image and the detected background will identify elements of the foreground. Subsequent images/frames, are then compared with the model background to identify foreground objects. Block matching motion estimation techniques are then applied to the foreground objects identified from the current and previous image/frame to deduce any moving objects. If it is determined that a foreground object has not moved for a predefined number of frames, that foreground object is determined as being stationary. The predefined number of frames may be set by a user to configure how long an object must be stationary for the incident analysis function to be triggered. This video incident analysis function is an example of a pixel-level function, as the analysis is performed on a pixel-level.

A further example of a video analysis function is a zone tracker function that identifies when an object moves from a first user defined detection area to a second user defined detection area of the frame/image. The function initially detects the background of an image/frame in the same way as described above in relation to identifying a stationary object, and similarly identifies foreground objects. In this function, the foreground objects are segmented and tracked using a Kalman filter to calculate the trajectories of the observed foreground objects from one frame/image to the next. The zone tracker function is satisfied when an observed foreground object is determined as having moved from the first user defined detection area to the second user defined detection area.

Other individual video analysis functions may be provided, and/or that combine the functionality of one or more of the other video analysis functions.

The control unit 310 is configured to poll the scheduler database 224 periodically at the start of every timeslot, in this example every 30 minutes, and retrieve from configuration file data store 220 the configuration files that are recorded as being applicable to the next timeslot. If the configuration file for the next time slot is the same as the configuration file for the previous timeslot, the control unit 310 determines that the analysis functions that have been enabled in the incident processors 302, 304, 306 should remain the same and takes no further action in relation to the loading of configuration files until the next timeslot when the control unit 310 polls the scheduler database 224 again.

If the control unit 310 determines that the next configuration file is different to the configuration file for the previous timeslot, the control unit 310 retrieves the identified configuration file from the configuration file data store 220 and loads each of the incident analysis functions into the corresponding incident processors 302, 304, 306 as determined from the data source identifiers that form part of the configuration file.

Non-limiting examples of video incident analysis functions include the determination of a stationary object, loitering, congestion, and running Non-limiting examples of audio incident analysis functions include the determination of a gunshot, aggressive noise, and a scream. Non-limiting examples of external incident analysis functions include the activation of a fire alarm, an emergency alarm, and the triggering of a motion sensor.

In addition, the control unit 310 configures the logic unit 308 to perform logical operations on the outputs of the incident processors 302, 304, 306 as identified in the configuration file. The logical operations include applying one or more contemporaneous analysis functions to the outputs of the incident processors 302, 304, 306, applying one or more sequential analysis functions to the output of the contemporaneous analysis functions, and applying one or more alarm parameters to the output of the sequential analysis functions.

Figure 4:
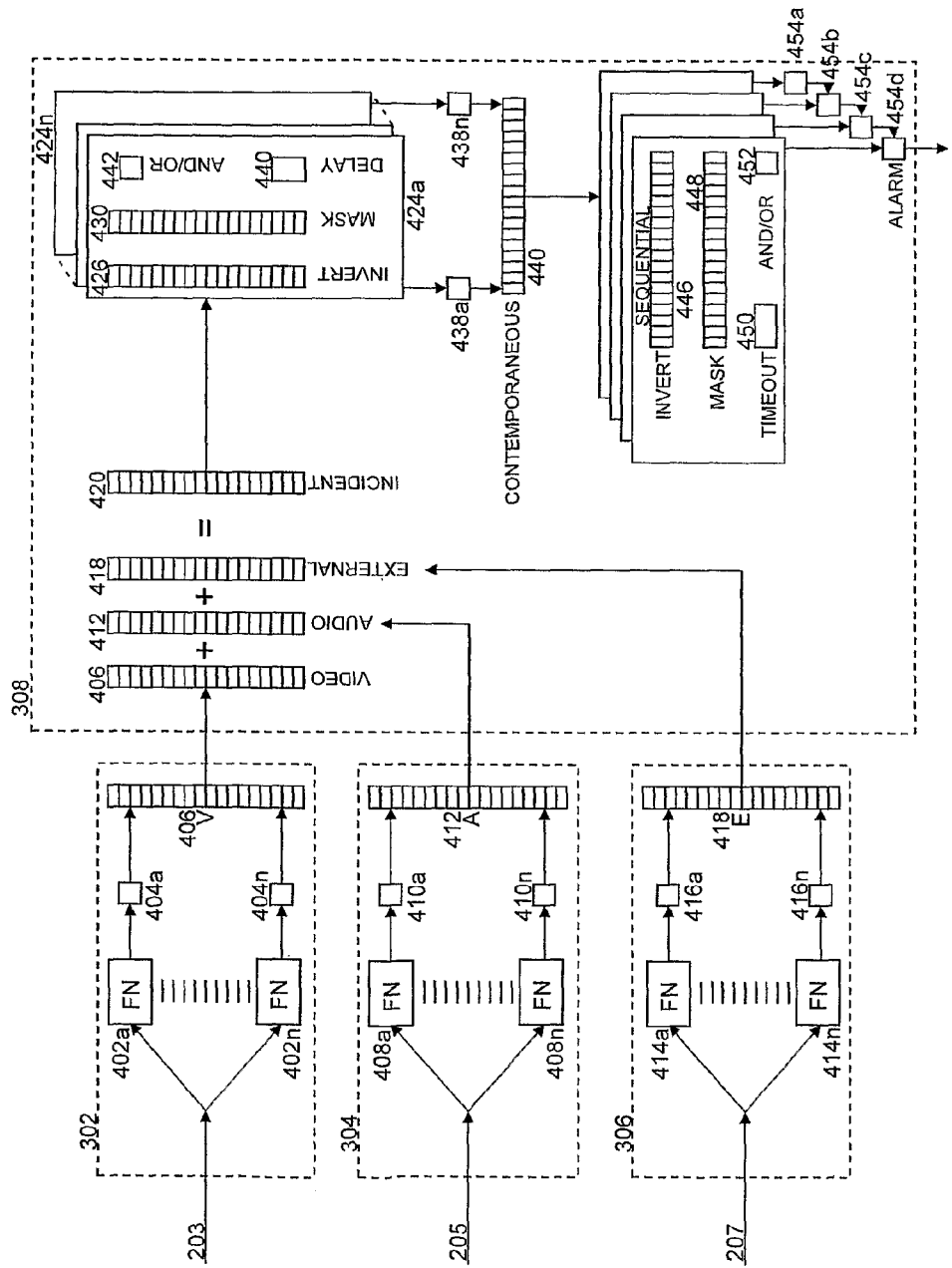
FIG. 4 shows an embodiment of processing performed by an alarm engine according to an embodiment of the invention.

The contemporaneous and sequential analysis functions are described in more detail in relation to FIG. 4.

In this embodiment the video incident processor 302 is configured to receive video data 203 from a single camera, and a separate video incident processor is provided for each camera supported by the alarm engine 108. In other embodiments, a video incident processor may be configured to receive and process data received from a plurality of cameras.

In this embodiment, the video incident processor 302 is configured to perform up to a maximum of 32 separate video incident analysis functions on the data received from the camera and provide the results of the application of the video incident analysis functions to the logic unit 308.

Similarly, the audio incident processor 304 is configured to receive audio data from a single microphone and perform up to a maximum of 32 separate audio incident analysis functions on the data received from the microphone. The audio incident processor 304 is configured to provide the results of the audio analysis functions to the logic unit 308. In other embodiments, an audio incident processor may be configured to receive and process data received from a plurality of microphones.

In this embodiment the external incident processor 306 is configured to receive external data from one or more external sources/sensors. The external incident processor 306 is configured to perform up to a maximum of 32 separate external incident analysis functions on the data received from the external sources. The external incident processor 306 is configured to provide the results of the external analysis functions to the logic unit 308.

In this embodiment a total of 32 incident analysis functions can be configured for a single configuration file. That is, the combination of the video, audio and external incident analysis functions that are utilised by the configuration file cannot exceed a sum total of 32. This restriction is enforced by a user interface when the user is configuring the configuration file. A single configuration file may define a plurality of alarms that process the results of the 32 incident analysis functions in different ways. In embodiments where a configuration file defines a single alarm, a total of 32 incident analysis functions can be configured for a single alarm.

Conveniently, the output signal generated by each of the incident analysis processors is a 32 bit signal which is known as a "dword", wherein each of the bits can represent a result of an incident analysis function. A dword is a known computer science term for a unit of data having 32 bits.

Using a 32 bit dword makes efficient use of computer resources as the signals can be easily manipulated/transformed using logical operations including "AND" and "OR" functionality, as well as "equals to", "greater than" and "less than", examples of which are described in relation to FIG. 4 below.

The logic unit 308 is configured to combine the video, audio and external incident output signals to generate an incident analysis output signal that provides a representation of the result of the application of the incident analysis functions to the received video, audio and external data such that the results of the different analysis functions can be processed collectively.

The logic unit 308 is configured to perform up to 32 contemporaneous analysis functions on the incident analysis output signal and generate a contemporaneous analysis output signal representative of the result of the contemporaneous analysis functions. The contemporaneous output signal is a 32 bit dword wherein each bit represents the result of a contemporaneous analysis function.

The contemporaneous analysis functions are performed on the incident analysis output signal, which is an indirect representation of the received audio, video and external data.

A contemporaneous analysis function comprises applying one or more rules to the results of the incident analysis functions. The rules may define a Boolean equation that is applied to one or more of the results of the incident analysis functions. In addition, a contemporaneous analysis function includes a variable that defines a timer delay period, which defines a period of time for which the contemporaneous analysis rule must be satisfied in order for the contemporaneous analysis function to be satisfied.

The logic unit 310 is also configured to sequentially perform one or more sequential analysis functions on the contemporaneous analysis output signal and generate a sequential analysis output signal that is representative of the output of the last sequential analysis function in the sequence. The output of a sequential analysis function is only set as '1' if the output of the previous sequential analysis function is '1' when the current sequential analysis function is triggered. The output of the last sequential analysis function is a single bit that identifies whether or not an alarm has been determined.

The sequential analysis functions are performed on the contemporaneous analysis output signal, which is itself an indirect representation of the received audio, video and external data.

A sequential analysis function comprises applying one or more rules to the results of the contemporaneous analysis functions. The rules may define a Boolean equation that is applied to one or more of the results of the contemporaneous analysis functions. In addition, a sequential analysis function includes a variable that defines a timeout period, which defines a time period for which the output of the sequential analysis function remains true after the corresponding rule has been satisfied. The timeout period is used to define a time period during which the next sequential analysis function must become true for the sequence to continue.

FIG. 4 illustrates an example of how received audio, video and external data are analysed/processed by the video incident processor 302, audio incident processor 304, external incident processor 306, and logic unit 308.

As described above, the video, audio and external data 203, 205, 207 received by the incident processors 302, 304, 306 have been converted from analogue to digital data at a sampling frequency of 5 Hz. Therefore the subsequently described analysis is performed for each piece of digital data (audio, video and external), and a new piece of digital data is received every 0.2 seconds.

The received video data 203 is applied to 32 video incident analysis functions 402a to 402n. The video incident analysis functions 402 are pattern recognition algorithms that are configured to recognise certain incidents/behaviours in the video data. The specific video incident analysis functions 402 that are enabled, and their associated function, are set by the control unit 310 as described above in relation to FIG. 3.

The output of each video incident analysis function 402 is a single bit 404 that indicates whether or not the incident/behaviour has been recognised.

The video incident analysis processor 302 then concatenates the 32 single bits 404 into a 32 bit "video incident mask" dword 406, and sends the "video incident mask" dword 406 to the logic unit 308.

Similarly, the audio incident analysis processor 304 applies 32 audio incident analysis functions 408 to the received digital audio data 205 and generates 32 output single bits 410, which are concatenated into a 32 bit "audio incident mask" dword 412 and sent to the logic unit 308.

In the same way, the external incident analysis processor 306 applies 32 external incident analysis functions 414 to the received digital audio data 207 and generates 32 output single bits 416, which are concatenated into a 32 bit "external incident mask" dword 418 and sent to the logic unit 308.

In some embodiments, the received audio data signal 205 and/or the received external data signal 207 may already provide a representation of whether or not predefined incident analysis functions are satisfied. In such embodiments, the audio incident processor 304 and/or external incident processor 306 are configured to translate the received signal 205, 207 into the "audio/external incident mask" 412, 418 that represents the specific audio/external incident function outputs for the configuration file that has been loaded into the audio/external incident processors 304, 306.

Each of the video, audio and external incident analysis functions 402, 408, 414 can be considered as being associated with a channel between 1 and 32 which corresponds to the bit position in the "video/audio/external incident mask" 406, 412, 418. Typically the channel to which the incident analysis function is attributed is set when a user sets up the configuration file.

In this embodiment, a single incident analysis function 402, 408, 414 is configured to perform an analysis of only one of audio or video or external data 203, 205, 207. The setup of the configuration file ensures that for a given bit position/channel an incident analysis function 402, 408, 414 can be enabled for only one of the video incident analysis processor 302, or the audio incident analysis processor 304, or the external incident analysis processor 306.

When the incident analysis function 402, 408, 414 is satisfied, a '1' is stored in the corresponding audio, video or external 32 bit "incident mask" 406, 412, 418 at the corresponding bit position. Therefore, the value in any of the "incident masks" 406, 412, 418 for a given bit position can only be '1' in a maximum of one of the "incident masks" 406, 412, 418.

The logic unit 308 performs a summation or a bitwise "OR" of the 32 bit audio, video and external incident masks 406, 412, 418 to generate an incident analysis output signal 420 which in this embodiment is a 32 bit dword that represents a mask of the output of all incident analysis functions.

The 32 bit incident analysis output dword 420 is made available for contemporaneous analysis processing by the logic unit 308.

The contemporaneous analysis processing comprises 32 contemporaneous analysis functions 424a to 424n that are configured to process the incident analysis output signal 420 and generate a single output bit 438 representative of whether or not the contemporaneous analysis function 424 is satisfied. Each contemporaneous analysis function 424 is represented by two 32 bit dword operational masks 426, 430, a delay period parameter 440, and an "and/or identifier" 442, the application of which will be described in more detail with reference to the example illustrated in FIG. 5.

Figure 5:
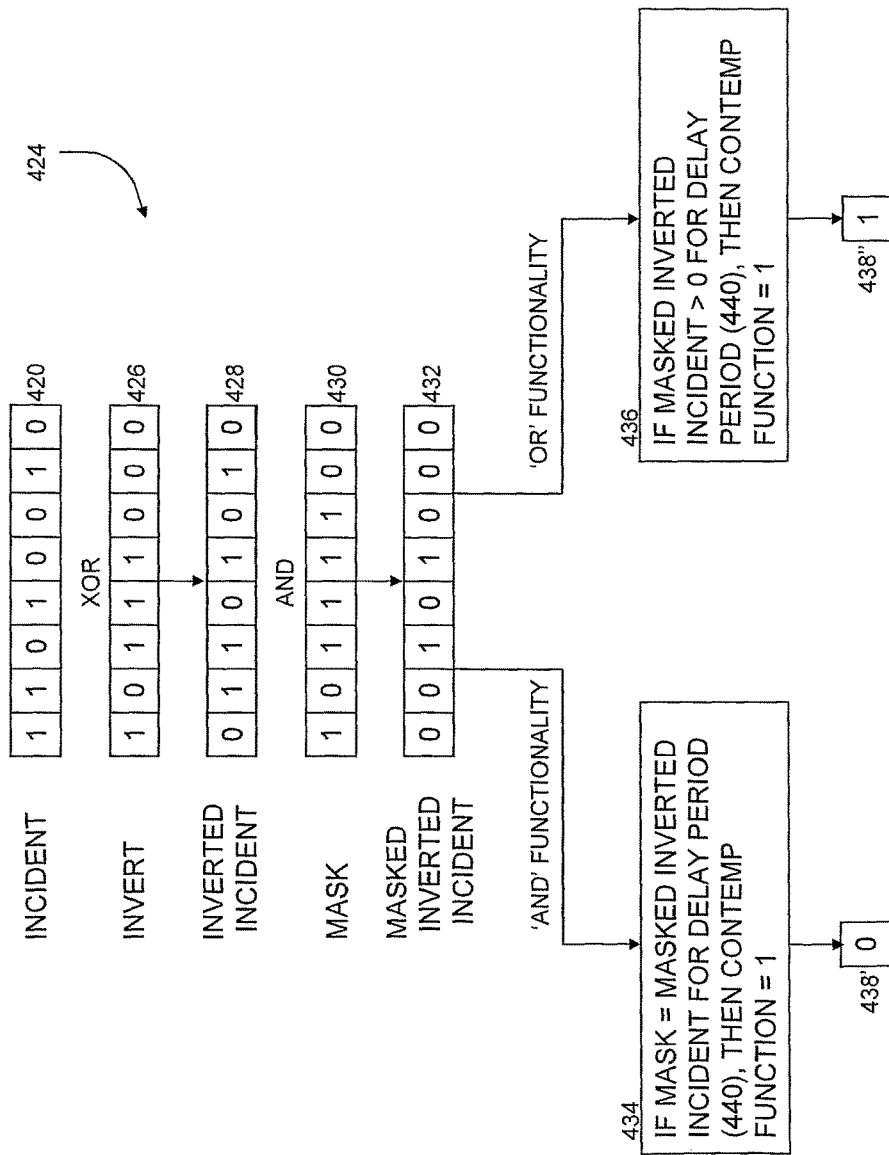
FIG. 5 shows an embodiment of a contemporaneous analysis function according to an embodiment of the present invention.

The example illustrated in FIG. 5 is described in relation to 8 bit signals to aid clarity, and it will be appreciated that the same principles apply to the 32 bit dword signals of the embodiment illustrated in FIG. 4.

As described above, the values of the bits in the operational masks 426, 430, the value of the delay period 440, and the "and/or identifier" 442 are set automatically by the control unit 310 in accordance with the values stored in configuration file 1514.

The first operation that is performed on the 32 bit incident analysis output dword 420 as part of the contemporaneous analysis function is to invert any individual incident analysis function output bits using an invert mask 426. This functionality enables a user to define whether the presence or absence of an incident is utilised as part of the contemporaneous analysis function 424.

The control unit 310 stores a "1" in the invert operational mask 426 where the configuration file defines that the functionality of a "NOT" gate is applied to the output of the corresponding incident analysis function 402, 408, 414. Application of the invert operational mask 426 to the incident analysis output dword 420 is provided by applying a bitwise logical "XOR" function to the incident analysis output dword 420 and the invert mask 426 to generate an inverted incident 32 bit dword 428. The logical functions are applied bitwise: that is, the corresponding bits are operated on, and it is not the 32 bit dwords that are operated on collectively.

The second operation that is performed as part of the contemporaneous analysis function 424 is to mask out any incident analysis functions that are not enabled for the contemporaneous analysis function 424 in question. This functionality is provided by using a 32 bit operational mask dword 430 that comprises a "1" for bit positions/channels for which corresponding incident analysis functions are to be considered, and a "0" for bit positions/channels for which corresponding incident analysis functions are not to be considered.

Bitwise logical "AND" functionality is applied to the inverted incident mask dword 428 and the operational mask dword 430 to generate a masked inverted incident dword 432. This ensures that the output of the incident analysis functions 402, 408, 414 (inverted where necessary) is carried through to the masked inverted incident dword 432 for bits that are enabled for the contemporaneous function 424. Any incident analysis functions that not enabled as identified by a "0" in the corresponding bits in the mask operational dword 430, will always be "0" in the masked inverted incident dword 432.

The "and/or identifier" 442 is used to define whether "AND" or "OR" functionality is applied to the enabled incident analysis functions. The value of the "and/or identifier" 442 is set by the control unit 310 in accordance with the configuration file retrieved from memory.

If the "and/or identifier" 442 identifies that logical "AND" functionality is to be applied, the logic unit 308 compares the operational mask dword 430 with the masked inverted incident dword 432. If the logic unit 408 determines that the operational mask dword 430 is the same as the masked inverted incident dword 432 at that instant and also for the previous period of time defined by the delay period 440, then the output 438' of the contemporaneous analysis function 424 is set as "1" (step 434). In the example shown in FIG. 5, the operational mask dword 430 is not the same as the masked inverted incident dword 432, and therefore the output 438' of the contemporaneous analysis function 424 is set as "0".

If the "and/or identifier" 442 identifies that logical "OR" functionality is to be applied, the logic unit 308 performs a bitwise comparison with a 32 bit dword having all bits set as '0' (not shown). If the result of comparison identifies that the dwords are not the same, the logic unit 308 determines that the masked inverted incident dword 432 has at least one bit that is set as '0' at that instant, and therefore the "OR" functionality is satisfied. If the "OR" functionality has also been satisfied for the previous period of time defined by the delay period 440, then the output 438" of the contemporaneous analysis function 424 is set as "0" (step 436). In the example shown in FIG. 5, the masked inverted incident dword 432 is greater than zero, and as long as the masked inverted incident dword 432 has been greater than zero for at least the delay period, the output 438" is set as "1".

In other embodiments, the logic unit 308 can support the application of more complex logical functions to the incident analysis function output signal 420.

The output of each contemporaneous analysis function 424 is a single bit 438 that indicates whether or not the contemporaneous analysis function 424 is satisfied.

The logic unit 308 is configured to concatenate the 32 single bits 438 into a 32 bit "contemporaneous incident mask" dword 440, and makes the "contemporaneous incident mask" dword 440 available for sequential analysis processing.

The sequential analysis processing is performed by up to four sequential analysis functions 442 on the contemporaneous analysis output signal 440. The sequential analysis functions 442 evaluated in sequence, whereby the immediately subsequent sequential analysis function 442 cannot be triggered unless the immediately previous sequential analysis function 442 is satisfied at the same time as the triggering of the subsequent sequential analysis function 442.

The sequential analysis functions 442 comprise an invert operational mask 446, an operational mask 448 which defines which of the contemporaneous analysis functions 424 are utilised by the sequential analysis function 442, a timeout period parameter 450, and an "and/or identifier" 452.

The invert operational mask 446, the operational mask 448, and the "and/or identifier" 452 are implemented in a similar way to the corresponding features of the contemporaneous analysis function 424 described above, and therefore are not described again. The timeout period parameter 450 defines a period of time for which the associated sequential analysis function 442 remains true after the sequential analysis function 442 is initially satisfied.

As shown schematically in FIG. 4, the output of each of the sequential analysis functions 442 is a single bit 454, and the immediately subsequent sequential analysis function output bit 454 can only be set as '1' when the immediately preceding sequential analysis function output bit 454 is also a '1'. For example, the output bit 454b of the second sequential analysis function cannot be set as a '1' unless the output bit 454a was the first sequential analysis function is also '1'.

The output 454d of the last sequential analysis function 442 is also an alarm identifier. That is, when the last sequential analysis function 442 is satisfied the alarm is generated. It will be appreciated that the configuration file may not necessarily use all of the available sequential analysis functions, and that if only two sequential analysis functions are required, the first two sequential analysis functions 442 are not used, and the sequential analysis processing begins with the generation of the output bit 4504c of the third sequential analysis function 442.

An example of how the timer delay is used by a contemporaneous analysis function is illustrated in FIG. 6a. FIG. 6a shows the value of a contemporaneous analysis function output 604, and the rule output 902 associated with that contemporaneous analysis function over time. A value of 0 indicates that the rule or contemporaneous analysis function is not satisfied, and an output value of 1 indicates that the rule or contemporaneous analysis function is satisfied.

At time t1, the inputs to the contemporaneous analysis function satisfy the rule and the value of the rule output 602 changes from 0 to 1 which initiates the timer delay period. However, in this example the inputs to the contemporaneous analysis function change at time t2 such that the rule is no longer satisfied. The time period between t2 and t1 is less than the timer delay, and therefore the contemporaneous analysis function is not triggered.

At time t3, the inputs to the contemporaneous analysis function again satisfy the rule and the value of the rule output 602 changes from 0 to 1. This time, the rule output 602 remains at 1 when the timer delay expires at time t4 and therefore the contemporaneous analysis function output 604 changes from 0 to 1. The contemporaneous analysis function output 604 remains as 1 until the rule is no longer satisfied at time t5.

In this embodiment, a maximum number of thirty two contemporaneous analysis functions can be defined for a single alarm.

An example of how the timeout is used by a sequential analysis function of 640 is illustrated in FIG. 6b. FIG. 6b shows the value of sequential analysis function 1 output 620, sequential analysis function 2 output 622, and the alarm output 624. Sequential analysis function 1, sequential analysis function 2, and the alarm are sequentially configured such that sequential analysis function 1 must precede sequential analysis function 2 before the alarm is generated.

A value of 0 indicates that the sequential analysis function is not satisfied, and an output value of 1 indicates that the sequential analysis function is satisfied. The generation of an alarm is indicated as an impulse signal.

At time t1, the inputs to sequential analysis function 2 satisfy the associated rule. However, as sequential analysis function 1 620 has not been satisfied in the preceding pre-requisite timeframe as defined by the timeout value of sequential analysis function 1, the alarm 624 is not generated.

At time t2, the inputs to sequential analysis function 1 satisfy the associated rule. As sequential analysis function 1 is the first sequential analysis function in the sequence there is no preceding sequential analysis function output value to be considered and the output of sequential analysis function 1 620 changes from 0 to 1. This initiates the timeout period associated with the sequential analysis function 1 as illustrated in FIG. 6b. It does not matter how long the output of sequential analysis function 1 620 remains as a 1, as the timeout period has been initiated.

At time t3, the inputs to sequential analysis function 2 satisfy the associated rule. The difference in time between t3 and t2 is less than the timeout period as illustrated in the figure, and therefore sequential analysis function 2 is satisfied and the output of sequential analysis function 2 924 changes from 0 to 1.

In this example, sequential analysis function 2 is the last sequential analysis function in the sequence of sequential analysis functions and therefore an alarm 624 is generated at time t3.

In other embodiments, the timeout period may be initiated upon a change in the output value from 0 to 1 of the sequential analysis function, but extended to expire after the predetermined time has elapsed since the output value of the sequential analysis function changes from 1 to 0.

FIG. 7 shows schematically an embodiment of a file 700 comprising image data 700 and an appended header 704 that comprises supplemental information about the image data 700. The appended file 700 comprises image data in jpeg format 702, and a header 704.

As described above, the alarm engine is configured to generate an image file periodically five times every second that corresponds to a snapshot image of the video data received from a camera, and append supplemental data representative of the analysis performed on the image to each image file In this embodiment, the header file comprises a timestamp 718, data 710 representative of objects identified in the image data 702, data 712 representative of incident analysis performed on the image data, data 714 representative of contemporaneous analysis performed on the image data, and data 716 representative of whether or not an alarm has been generated by the analysis performed on the image data.

The data 712 representative of incident analysis is the 32 bit dword 406 described below in relation to FIG. 4, the data 714 representative of contemporaneous analysis is the 32 bit dword 440 described below in relation to FIG. 4, and the data 716 representative of whether or not an alarm has been generated is the bit 454d described below in relation to FIG. 4.

In some embodiments, the file 700 may also comprise optional audio data 706 and/or external data 708. It will be appreciated that in such embodiments, the header data 704 may also comprise data representative of analysis performed on the audio data 706 and/or external data 708.

As described above, a user can use a Graphical User Interface (GUI) accessible from the user terminal 108 to configure the analysis that is to be performed by the server 100. In this embodiment, there are two different GUIs: a CONFIGURE GUI and a MANAGE GUI.

FIGS. 8 to 14 illustrate an embodiment of a CONFIGURE GUI that is displayed on a user terminal 108 to enable the user to configure the analysis that is performed on the received data. Typically, a manager of a security company will have access to the CONFIGURE GUI to manage how and when alarms are generated.

Figure 15:
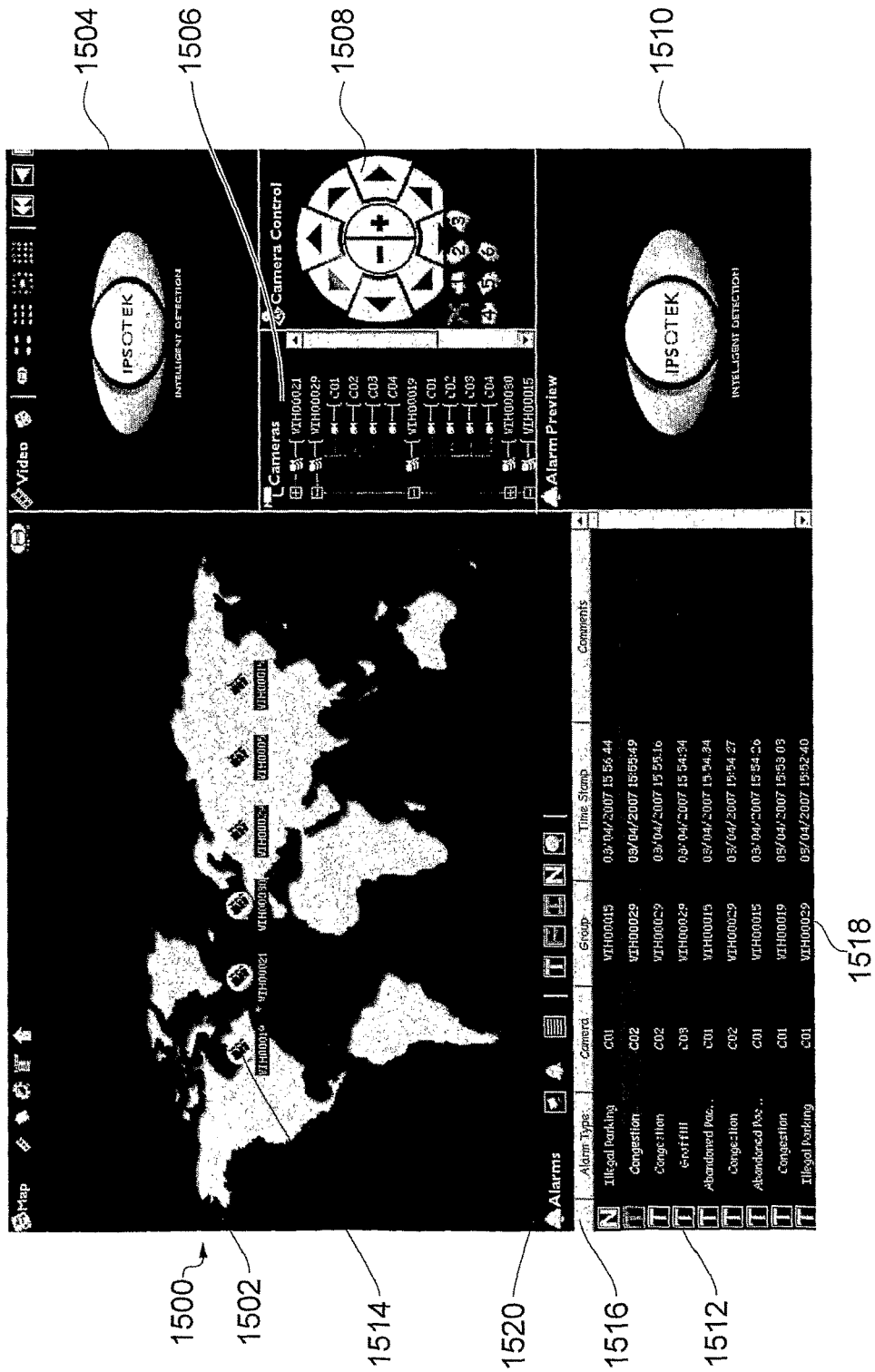
FIGS. 15 and 16 illustrate display screens of a MANAGE GUI according to an embodiment of the invention.
Figure 16:
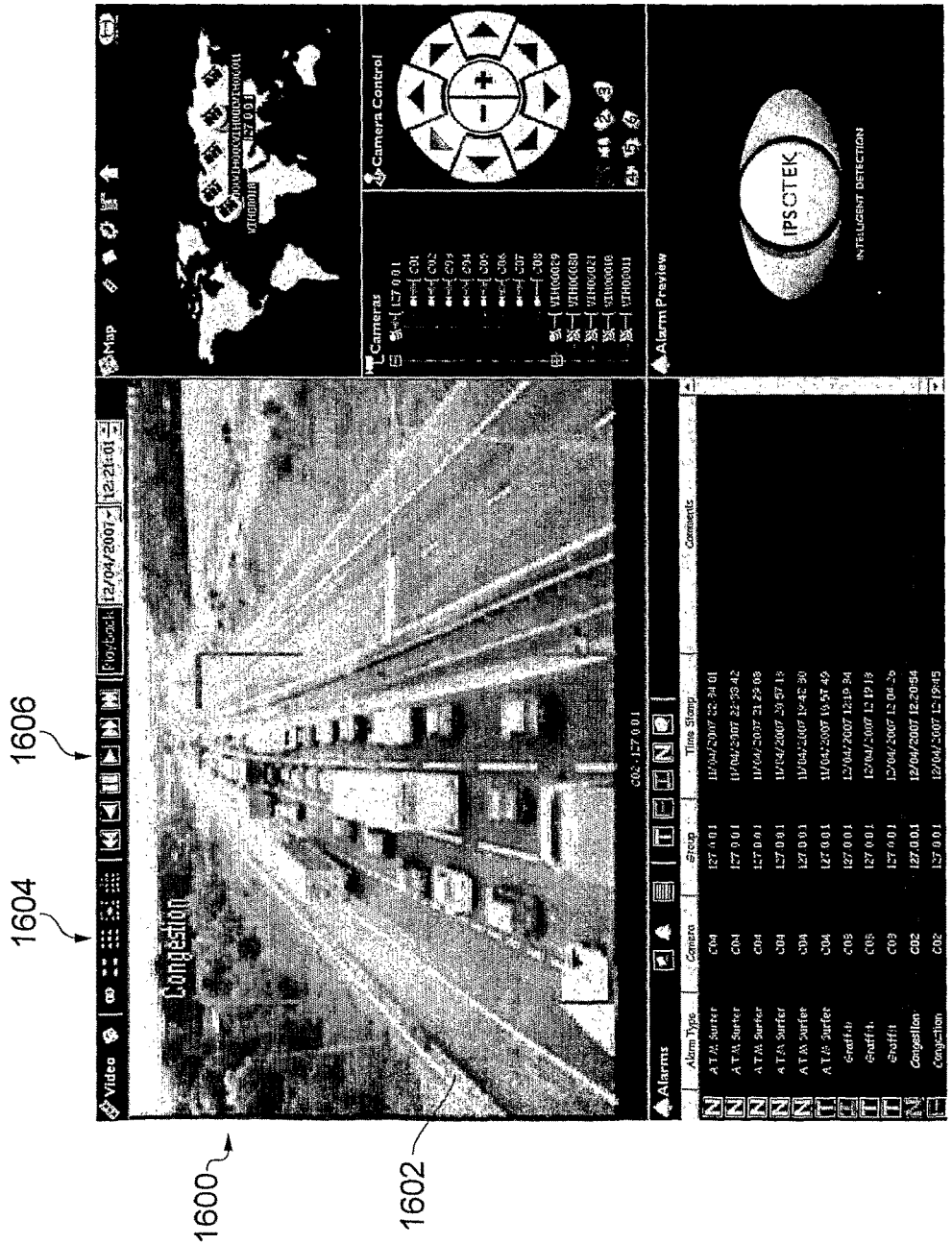

FIGS. 15 and 16 illustrate an embodiment of a MANAGE GUI that is displayed on the same, or a different, user terminal 108 to enable a user to manage alarms that are generated. Managing the alarms may include acknowledging the alarms as true, false or to be ignored, and undertaking any subsequent action as appropriate. An example of subsequent action may be alerting the police of a crime. In some embodiments, the subsequent action may be performed automatically as part of the alarm generation process. Typically, a security guard who is an employee of a security company will have access to the MANAGE GUI.

Returning to the CONFIGURE GUI, the CONFIGURE GUI comprises six different display screens: floorplan 800; schedule 900; parameters 1000; alarms 1100; zones 1300; and log 1400, that can be navigated between by a user selecting respective tabs 820, 822, 824, 826, 828 and 830. Each of the display screens will now be described in detail with reference to FIGS. 8 to 14.

Figure 8:
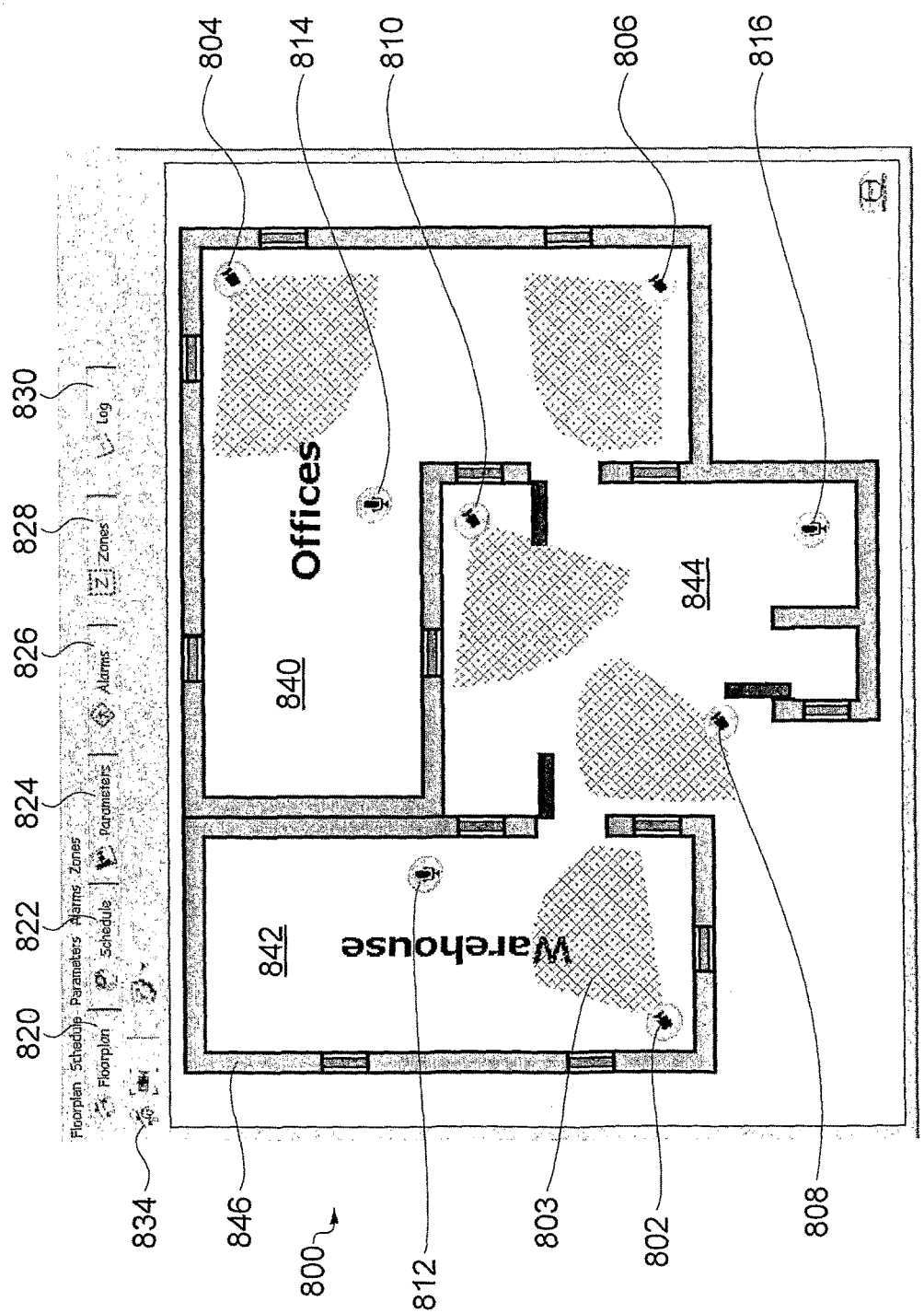
FIGS. 8 to 14 illustrate display screens of a CONFIGURE GUI according to an embodiment of the invention.

FIG. 8 shows an embodiment of a floorplan display screen 800 of the CONFIGURE GUI. The floorplan display screen 800 allows a user to view a graphical represent of the locations of cameras and microphones in communication with the server 100 to which the user terminal 108 is in communication. In this embodiment, the server 100 is configured to receive signals from five cameras 802, 804, 806, 808, 810 and microphones 812, 814, 816 to monitor a single building 846. The building 846 comprises offices 840, a warehouse 842, and a lobby 844.

In other embodiments, a single server 100 may be configured to monitor a single room, a plurality of rooms, a single building, a plurality of buildings, an outdoor scene, or any other area or areas for which monitoring/surveillance is required.

In order to initially display the background image of the scene which is to be monitored, the user selects the "map icon" 834 and loads an image of the relevant scene. In this example, the user has selected a schematic diagram of the building as shown in FIG. 8. The user then schematically indicates on the background image where the cameras 802, 804, 806, 808, 810 and microphones 812, 814, 816 are located in the scene. In this example, the user drags and drops the cameras/microphones to the appropriate regions of the scene.

The floorplan display screen 800 provides a convenient interface for a user to graphically relate the geographical locations of one or more cameras and/or microphones.

In this embodiment, the user can also provide an indication in the image of the direction in which the cameras are facing. This is shown schematically in FIG. 8, an example of which is the viewing region 803 of camera 802.

Figure 9:
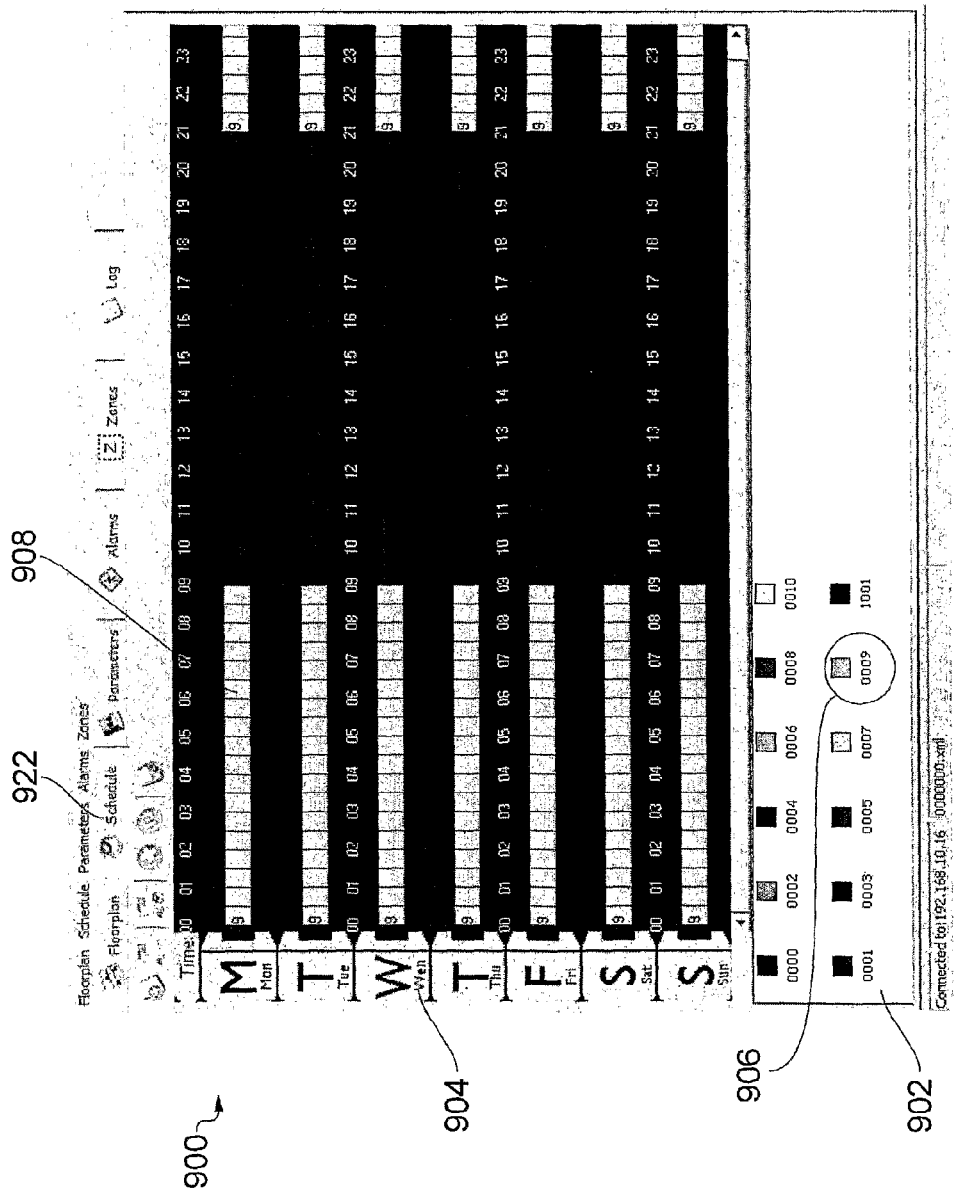

FIG. 9 shows an embodiment of the schedule display screen 300 of the CONFIGURE GUI. The schedule display screen 300 is used to create new configuration files, and select which configuration file is applied at which times. In this example, the schedule display screen 300 graphically illustrates a week split into 30 minute timeslots in an upper pane 904 of the display screen 900, and only a single configuration file can be applied to a given timeslot.

Each of the available configuration files are illustrated in the lower pane 902 of the schedule display screen 900. In this example, twelve configuration files have been generated and saved. The user can then graphically select which of the timeslots displayed in the upper pane 904 of the schedule display screen 300 to apply the configuration files.

In order to apply a configuration file at a given time, the user first selects the configuration file that they wish to apply, and then graphically selects an area in the upper pane 904, for example by clicking and moving a mouse, to produce a selection box. Any time period within the selection box will have the selected configuration file applied to it. An example of a selection box 908 to select the time between 3 a.m. and 6 a.m. on Monday and Tuesday is shown in FIG. 9. The colour of a timeslot will be changed to the colour of the selected configuration file when the configuration file is applied to that timeslot.

In this embodiment, a configuration file identifies one or more analysis functions, and how the analysis functions are linked together in order to generate one or more alarms. The analysis functions may comprise one or more, incident analysis functions, one or more contemporaneous analysis functions, and one or more sequential analysis functions. The configuration file may also comprise one or more alarm parameters, for example, priority, pre- and post-alarm playback period, alarm interval and alarm confidence parameters.

In some embodiments a configuration file may provide a representation of the analysis that is performed to generate a single alarm based on the output of any one or more of a plurality of cameras and/or microphones. In such embodiments, separate configuration files are generated for each alarm that is to be configured. Storing a single alarm in a configuration file provides a convenient way to enable more than one configuration file to be positioned in the schedule for application at the same time, whilst reducing the chances that the configuration files conflict with each other.

The user can repeat the process of generating and applying configuration files and save the schedule so that it is applied to the selected cameras/microphones.

In the example illustrated in FIG. 9, the configuration file 906 labelled "0009" has been applied between 21:00 and 09:00 on each day of the week, and no configuration files are applied between 09:00 and 21:00 on each day.

It will be appreciated that a user of the GUI can click the schedule tab 222 at any stage during the configuration of one or more alarms in order to generate new configuration files and/or change the times at which configuration files are applied.

Figure 10:
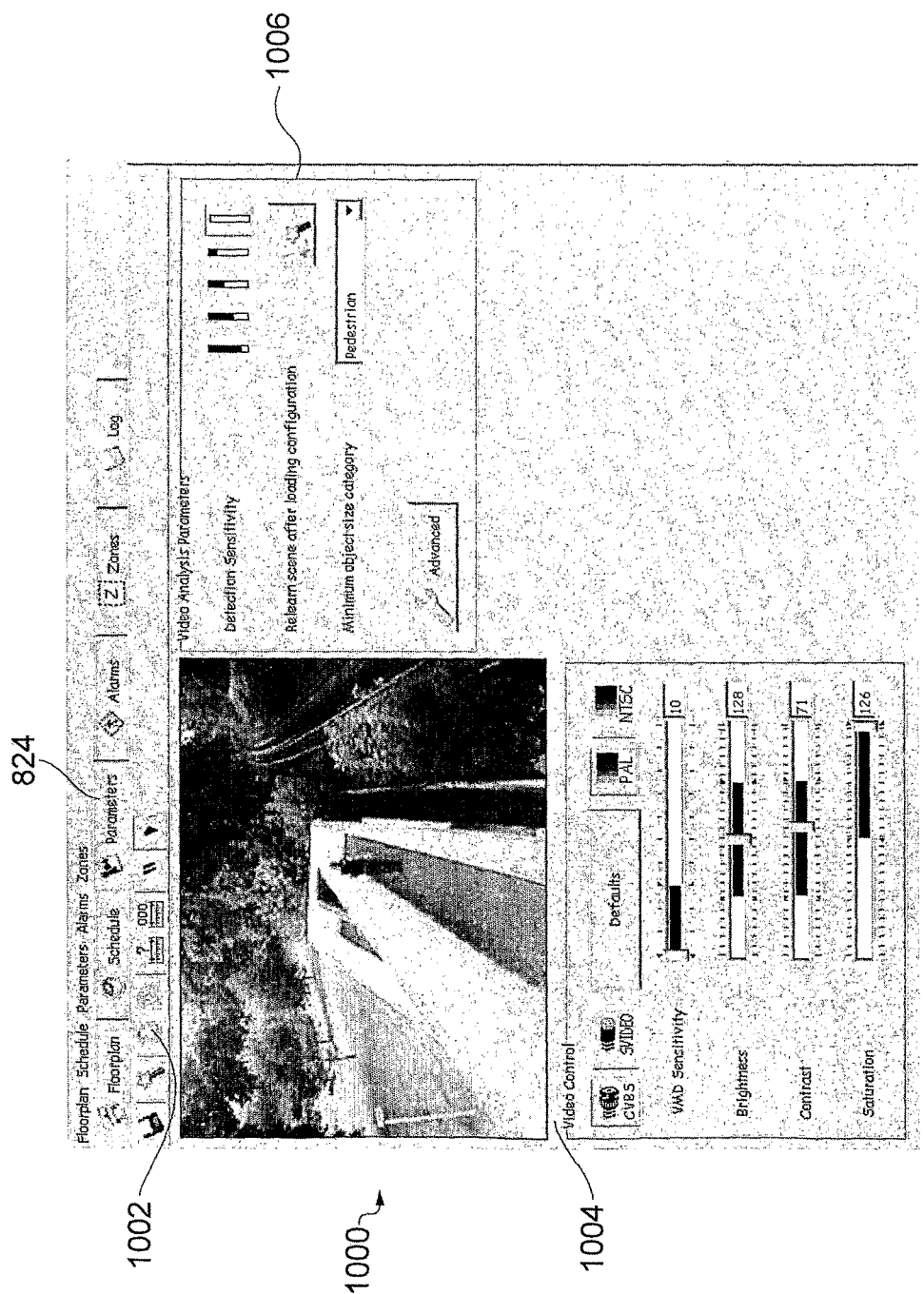

FIG. 10 shows an embodiment of a video parameters display screen 1000 of the CONFIGURE GUI for video data obtained from a camera. The video parameters display screen 1000 allows a user to adjust video control settings as well as video analysis parameters and allows the user to set up a scene that analysis will be applied to for that camera. A separate parameters display screen can be displayed for audio data.

The user can select the "plus" icon 1002 to display a full screen view of the video feed for the selected camera from which a portion of the image can be selected to be zoomed in on. Zooming in on the portion of the image enables the subsequent setup of incident analysis functions to be performed with a greater degree of resolution as discussed in more detail below. In addition, zooming in on the portion of the scene can be used to eliminate any unused edges around the outside of the image that may be present in the received video data.

The video control 1004 pane of the parameters display screen 1000 enables a user to change the input settings of the video and allows the user to alter the brightness, contrast and saturation of the video image. This enables the user to optimise the input video image for the subsequent analysis.

The video analysis parameters 1006 pane of the parameters display screen 1000 enables a user to change the variables used for scene analysis.

Figure 11:
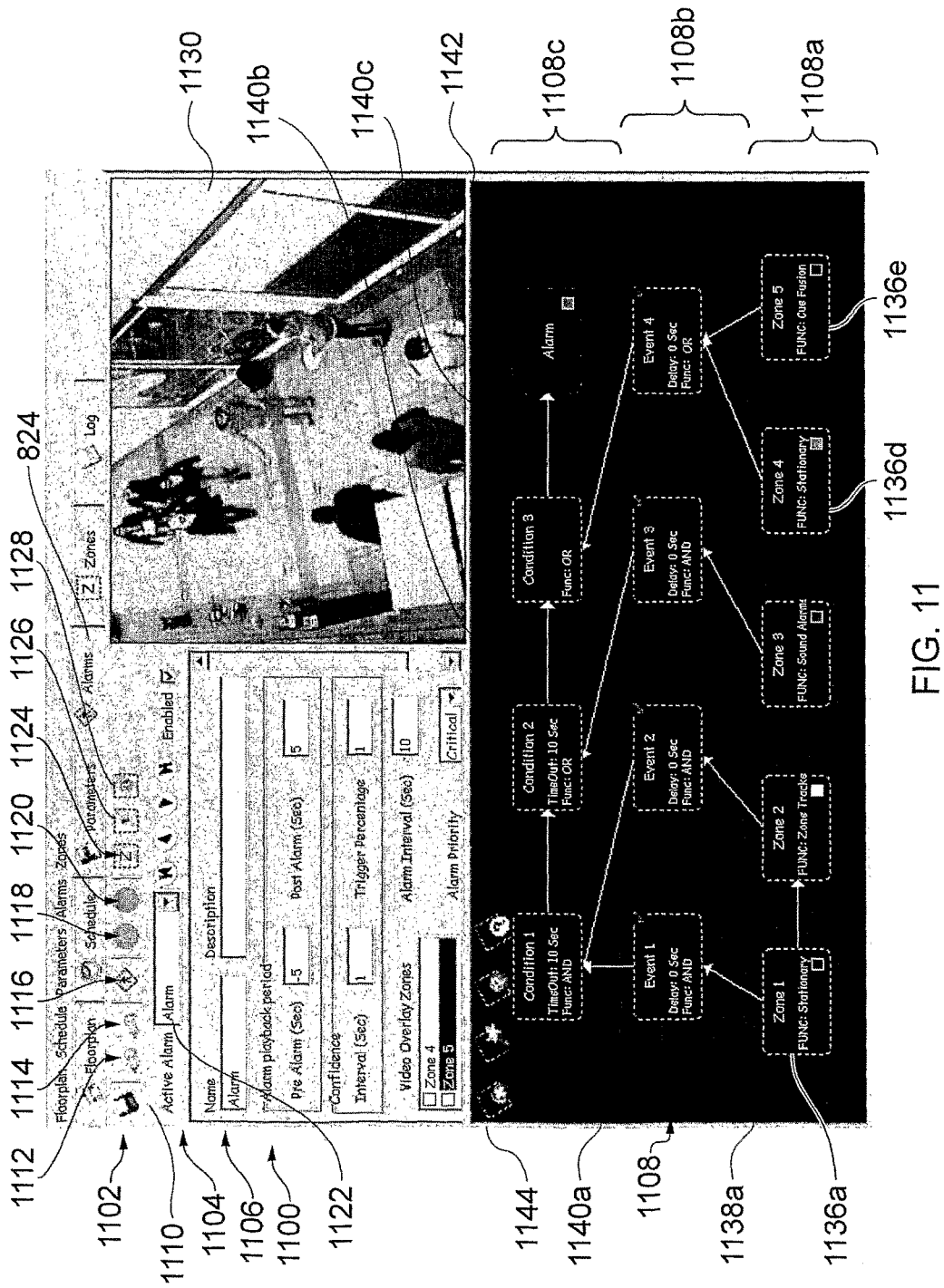

FIG. 11 shows an embodiment of the alarms display screen 1100 of the CONFIGURE GUI. The alarms display screen 1100 allows a user to create new incident analysis, contemporaneous analysis and sequential functions, and link these functions together to define one or more alarms.

The alarms display screen 1100 comprises a toolbar 1102, an alarm selection pane 1104, an alarm configuration pane 1106, an analysis configuration pane 1108, and a live video feed pane 1130. The analysis configuration pane 1108 comprises three tiers: a first tier 1108a in relation to incident analysis functions, a second tier 1108b in relation to contemporaneous analysis functions, and a third tier 1108c in relation to sequential analysis functions. Alarms are also displayed in the third tier 1108c.

In this example, the incident analysis functions 1108a are labelled zones, the contemporaneous analysis functions 1108b are labelled events and the sequential analysis functions 1108c are labelled conditions.

The toolbar 1102 provides the user with the functionality to define which analysis functions are performed on the received data, define how those analysis functions are connected together, save the configuration of analysis functions in the configuration file, save and load templates.

The first icon on the toolbar 1102 is the save configuration file icon 1110. Selecting the save configuration file icon 1110 causes the server 100 to update the configuration file with the changes made during the configuration process. In particular, the configuration file stores an electronic representation of the configured analysis functions that are employed to generate each of the alarms as represented in the analysis configuration pane 1108 of the alarms display screen 1100. Configuration files are described in detail herein.

A template may provide a predefined arrangement of incident, contemporaneous and sequential analysis functions that can be loaded into a configuration file. Templates that define the necessary analysis for determining common behaviours/scenarios can provide the advantage that the user of the GUI does not need to redefine analysis functions that have already been developed. In some embodiments, it may be possible for a user of the user terminal 108 to download templates that have been developed by a third party, for example a software provider, such that complex analysis functions can be developed efficiently and accurately.

User selection of icon 1112 enables a user to export the current configuration file to a template file, and selection of icon 1114 enables a user to import a template and add it to the current configuration file.

User selection of icon 1116 enables a user to preview the application of the selected configuration file to the image data generated by selected cameras, and display the analysis results on the live video feed pane 1130 without saving the changes to the configuration file.

User selection of icon 1118 enables a user to undo previous changes to the configuration since the last preview, and user selection of icon 620 enables a user to redo changes to the configuration since the last preview.

User selection of one of icons 1124, 1126, 1128 enables a user to create a new incident analysis function 1136, new contemporaneous analysis function 1138, and new sequential analysis function 1140 respectively for the "active alarm".

The "active alarm" is selected by the drop-down menu 1122 in the alarm selection pane 1104. The drop-down menu 1122 displays a list of existing alarms for the selected configuration file, and an option to generate a new alarm. The user can browse through existing alarms by selecting the arrow icons 632 to the right of the drop-down menu 1122, thereby scrolling through the existing alarms in the drop-down box 1122.

Selection of an existing alarm causes the configuration of that alarm to be displayed in alarm configuration pane 1106 and analysis configuration pane 1108.

The enable alarm checkbox 634 in the alarm selection pane 604 provides a user with the functionality to enable/disable the active alarm. The enable alarm checkbox 634 must be checked for an alarm to be generated/triggered when its associated analysis functions are satisfied.

The alarm configuration pane 1106 enables a user to define parameters associated with the active alarm. The user can enter the name and an optional descriptor in the name and description textboxes respectively.

The "Pre Alarm" and "Post Alarm" textboxes associated with the "Alarm playback period" enable a user to define the length of recorded video data leading up to, and following, the alarm generation that is made available to a user when playing the alarm back.

The confidence section of the alarm configuration pane 604 enables a user to define how precisely the alarm conditions must be met during a time interval in order to control whether or not an alarm message is generated.

The "interval" textbox enables a user to enter a value which defines the interval period of time during which the alarm output signal is analysed to determine whether or not the alarm message is generated. The "trigger percentage" defines the minimum percentage of time that the alarm output signal must be positive in the immediately preceding interval period for the alarm message to be generated.

If the minimum trigger percentage is not satisfied for the previous interval period an alarm message is not generated, although as described above the supplemental information that is stored in the header associated with the corresponding video data images does provide an indication that the alarm output signal is positive.

The "alarm priority" drop down menu allows a user to set the severity of the active alarm. A higher priority alarm takes precedence over a lower priority alarm if alarms occur simultaneously. In this example, the available priorities are: critical, high, medium, low, and silent. A silent alarm does not cause a visual/audio alert, although an alarm message is created as described above.

The "Video Overlay Zones" textbox provides a list of the enabled incident analysis functions 1136 that are used by the last sequential analysis function 1140 in the active alarm configuration. In this example the output of incident analysis functions 1136*d* and 1136*e* with the names "Zone 4" and "Zone 5" are used indirectly as inputs to the sequential analysis function 1140*c* named "Condition 3" which is the last sequential analysis function of the active alarm.

Checking one of the listed incident analysis functions causes the activity (such as stationary object) associated with that incident analysis function to be surrounded by a bounding box and labelled in the recorded video data when an alarm occurs. In addition, it is the data received from the data source associated with that incident analysis function 1136 that is made available to a user when playing the alarm back.

Only the incident analysis functions 1136*d*, 1136*e* associated with the last sequential analysis function 1140*c* are listed as it will be the occurrence of one of those incident functions that has led to the generation of the alarm.

This feature is particularly applicable to alarms that are generated as a result of incident analysis performed on data received from a number of sources. In such embodiments, it would generally not be desired to display/make available data in relation to a previous incident analysis function 1136 as the behaviour that caused that incident analysis function 1136 to be satisfied will not necessarily still be occurring due to the sequential nature of the sequential analysis functions 1140.

Incident Analysis Functions

Incident analysis functions 1136 represent a first tier of analysis functions 1108*a* that are performed on received audio and video data when generating an alarm 1142.

Incident analysis functions 1136 can be added to the active alarm by a user selecting the incident analysis function icon 1124. The added incident analysis function 1136 appears in the first tier 1108*a* of the analysis configuration pane 1108.

Figure 12:
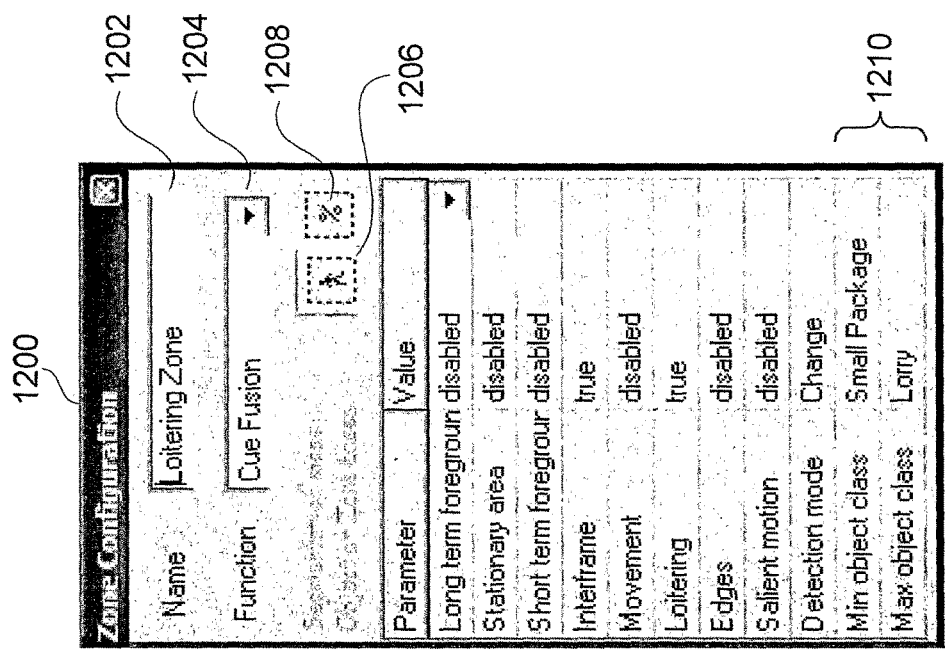

The user can configure a new incident analysis function 1136 by double clicking on the incident analysis function 1136, which will bring up a zone configuration dialog box, an example of which is illustrated in FIG. 12.

The zone configuration dialog box 1200 illustrated in FIG. 12 enables a user to change the name 1202 of the incident analysis function as well as select the incident analysis function 1204 that is to be defined.

In this example, the available incident analysis functions 1204 are stationary object, loitering, cue fusion, overcrowding, congestion, aggressive noise, gunshot, scream, zone tracker, object tracker, breaking glass, vehicle classification based on sound and object direction and speed detection.

The list of available incident analysis functions includes both audio and video incident analysis functions. In embodiments where the system receives data from more than one camera or microphone, a further drop-down box will be displayed that enables the user to select which of the cameras/microphones should be used as the source of the data to which the incident analysis function is applied.

The zone configuration dialog box 1200 also comprises a list of parameters and values associated with the selected incident analysis function 1136. The user can set the values for one or more of the parameters. The user can also select the segmentation mode of the incident analysis function: that is whether the incident analysis function is "object-based" by selecting icon 1206 or "zone-based" by selecting icon 1208.

Selecting object-based segmentation enables the user to define the size of an object to detect using the minimum and maximum object class parameters 1210 as illustrated in the parameters section 1208 of FIG. 12.

Alternatively, selecting percentage zone-based segmentation causes the minimum and maximum object class parameters 1210 in the zone configuration dialog box 1200 to be replaced with Area of Interest (AOI) parameters—"AOI Min %" and "AOI Max %"—to enable the user to define the thresholds for the percentage of the detection area to which the incident analysis function applies.

If object-based segmentation is selected, the object detection settings can be previewed on the zones display screen 1300 of the CONFIGURE GUI as illustrated in FIG. 13 and described below.

In this embodiment, the output of the incident analysis function is a binary signal representative of whether or not the incident analysis function is satisfied.

In this embodiment, a maximum of 32 incident analysis functions 1136 can be defined in a single configuration file.

Incident analysis functions can be deleted by dragging and dropping them onto the delete icon 1144.

Contemporaneous Analysis Functions

Contemporaneous analysis functions 1138 represent a second tier of analysis functions 1108*b* that are performed on the output of one or more of the incident analysis functions 1136 (first tier of analysis functions) when generating an alarm. In this embodiment, the contemporaneous analysis function 1138 comprises a rule and a timer period. The rule defines a Boolean logical operation that is performed on the output of one or more of the incident analysis functions 1136, and the timer period defines a period of time for which the rule must be satisfied for the contemporaneous analysis function 1138 to be triggered.

Contemporaneous analysis functions 1138 can be added to the active alarm by a user selecting the contemporaneous analysis function icon 1126. The added contemporaneous analysis function appears in the second tier 1108*b* of the analysis configuration pane 1108.

Contemporaneous analysis configuration takes place by selecting and modifying the contemporaneous analysis function parameters within the displayed contemporaneous analysis function 1138. The configurable parameters of a contemporaneous analysis function 1138 638 are:

name—"Event 1" can be changed to a more meaningful event name;

func—the logical function that is applied to the inputs from the incident analysis functions 1136. In this example, the available logical functions are "AND" and "OR";

delay—the timer delay in seconds for which the logical function defined by func must be satisfied for the contemporaneous analysis function 1138 to be triggered.

In addition, the contemporaneous analysis function 1138 can be enabled or disabled by double clicking the tick icon in the upper right-hand corner of the contemporaneous analysis function 1138.

In this embodiment, a maximum number of thirty two contemporaneous analysis functions 1138 can be defined for a single configuration file.

In order for the user to link the outputs of one or more incident analysis functions at 1136 to the inputs of one or more contemporaneous analysis functions 1138, the user can use a mouse to drag and drop an incident analysis function 1136 onto a contemporaneous analysis function 1138. If the user uses the right mouse button to drag and drop an incident analysis function 1136 onto a contemporaneous analysis function 1138 the output of the contemporaneous analysis function 1138 is inverted when it is subsequently processed by the contemporaneous analysis function in 1138. If the user uses the left mouse button, the output of the incident analysis function 1136 is not inverted.

When the output of an incident analysis function in 1136 is connected as an input to a contemporaneous analysis function 1138, the two are illustrated as being connected by an arrow in the analysis configuration pane 1108. If the user has used the right mouse button to connect the incident analysis function 1136 to the contemporaneous analysis function 1138, the two are illustrated as being connected by a dashed arrow in the analysis configuration pane 1108. A dashed arrow signifies that the functionality of a "NOT" gate is present between the two functions.

The output of a single incident analysis function at 1136 can be used as an input to one or more contemporaneous analysis functions 1138.

Sequential Analysis Functions

Sequential analysis functions 1140 represent a third tier of analysis functions 1108c that are performed on the output of one or more of the contemporaneous analysis functions 1138 (second tier of analysis functions) when generating an alarm. A sequential analysis function 1140 defines a function that is applied to the output of one or more of the contemporaneous analysis functions 1138.

If more than one sequential analysis function 1140 is utilised for an alarm, the conditions are defined in a chronological sequence from left to right. That is, the sequential analysis functions 1140 are sequentially linked such that the output of the second sequential analysis function 1140b can only be triggered if the function of the second sequential analysis function 1140b becomes true whilst the output of the immediately previous (first) sequential analysis function 1140a is true. Similarly, the output of the third sequential analysis function 1140c can only be triggered if the function of the third sequential analysis function 1140c becomes true whilst the output of the immediately previous (second) sequential analysis function 1140b.

In this example, the alarm 1142 is triggered by the third sequential analysis function 1140c. Whether or not an alarm message is generated is dependent upon the alarm confidence settings discussed above.

In this embodiment, the sequential analysis function 1140 comprises a rule and a timeout period. The rule defines a Boolean logical operation that is performed on the output of one or more of the contemporaneous analysis functions 1138, and the timeout period defines a period of time after the rule has been satisfied for which the output of the sequential analysis function 1140 remains true.

New sequential analysis functions 1140 can be added to the active alarm by a user selecting the sequential analysis function icon 1128. The added sequential analysis function 1140 appears in the third tier 608c of the analysis configuration pane 1108.

A user can configure the sequential analysis functions 1140 by selecting and modifying the sequential analysis function parameters within the sequential analysis function 1140. The configurable parameters of a sequential analysis function 1140 are:

name—"Condition 1" can be changed to a more meaningful condition name;

func—the logical function that is applied to the inputs from the sequential analysis functions 1138. In this example, the available logical functions are "AND" and "OR".

timeout—the maximum period of time in seconds for consecutive conditions to be achieved before resetting the sequence.

In this embodiment, a maximum number of four sequential analysis functions 1140 can be defined for a single configuration file. It will be appreciated that in other embodiments any number of sequential analysis functions 1140 can be defined as part of the analysis to generate a single alarm, and any number of sequential analysis functions 1140 can be defined for a single configuration file.

The outputs of one or more contemporaneous analysis functions 1138 can be provided as inputs to one or more sequential analysis functions 1140 by dragging and dropping a contemporaneous analysis function 1138 on to a sequential analysis function 1140 in the same way as incident analysis functions 1136 are dragged and dropped onto contemporaneous analysis functions 1138 as described above.

The output of a single contemporaneous analysis function 1138 can be used as an input to one or more sequential analysis functions 1140.

Where more than one sequential analysis function 1140 has been defined, the sequential analysis functions 1140 are automatically linked sequentially from left to right in the analysis configuration pane 1108.

The alarms display screen 1100 provides a user with a high degree of configurability and setting up an alarm 1142. The high degree of configurability allows sophisticated/complex scenarios to be monitored and reported by means of the generation of an alarm. In addition, the alarms display screen 1100 also enables the reporting of the alarm 1140 to be configured which enables a user to place greater confidence in the alarms, as they have been able to configure how and when the alarms are generated/reported.

Figure 13A:
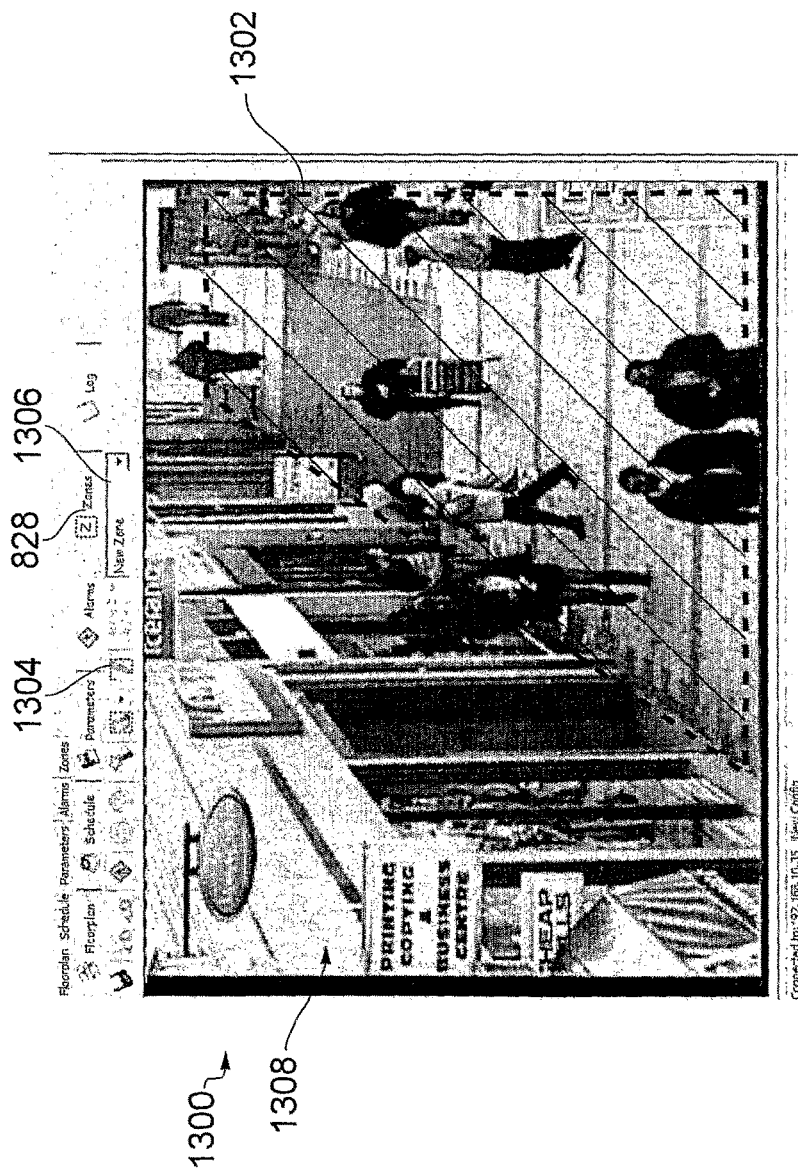

FIG. 13a shows an embodiment of the zones display screen 1300 of the CONFIGURE GUI. The zones display screen 1300 enables a user to create and define detection areas for incident analysis functions performed on video data.

Defining detection areas effectively applies a mask to the video image data. A detection area may be one or more sub-areas of the image selected in the parameters display screen 1000. A detection area may comprise the entire image produced by a camera, or one or more sub-areas of an image produced by a camera.

In order to define a detection area, the user initially selects an active zone from the "Active Zone Selector" drop down menu 1306. A "zone" is an alternative name for an incident analysis function. The user is presented with the option of generating a new incident analysis function/zone or selecting a pre-existing incident analysis function/zone (that may have been generated by the alarms display screen 1110 or by the zones display screen 1300) as the active incident analysis functions/zone.

After the user has selected the active incident analysis functions/zone they wish to work with, the user can click on the selection drawing tool icon 1304 to enable them to draw a selection area on the image 1308. The selection area will be used to define an area of the image 1308 that the user can use to modify the detection area for the active incident analysis function/zone.

When a user clicks on the selection drawing tool icon 1304 five additional icons 1350, 1352, 1354, 1356 and 1358 are displayed on the toolbar. The five additional icons are illustrated in FIG. 13b, and are used to determine how the detection area is modified by the selection area.

Figure 13B:
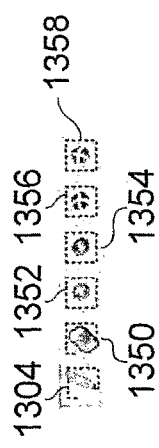

The five additional icons shown in FIG. 13b are:

"clear" icon 1350—selecting this icon clears/cancels the selection area;

"add current selection to zone" icon 1352—selecting this icon adds the selection area to the detection area;

"remove current selection from zone" icon 1354—selecting this icon removes the selection area from the detection area;

"add entire scene to zone" icon 556—selecting this icon adds the entire image/scene to the detection area; and "remove entire scene from zone" icon 558—selecting this icon removes the entire image/scene from the detection area.

In the example illustrated in FIG. 13a, the active incident analysis function/zone is "New Zone" as identified in drop-down menu 1306. The detection area 1302 associated with "New Zone" is illustrated on the image 1308. In this example, the detection area 1302 is a single sub-area of the image 1308.

In other examples, the detection area 1302 may comprise one or more sub-areas of the image 1308, which may or may not be contiguous. Conveniently, all corresponding sub-areas of the detection area for a single incident analysis function/zone are displayed in the same colour. This enables multiple detection areas to be displayed on the same image 1308 such that different incident analysis functions/zones can be easily distinguished from each other.

As described above, a user can return to the alarms display screen 1100 at any stage to configure any new incident analysis functions/zones that have been created by zones display screen 1300 by clicking on the alarms tab 824.

In this example, detection areas do not have the same meaning when applied to audio data. Due to the omnidirectional nature of the microphones used in this embodiment there is no concept of a "detection area" as it is not possible to audibly direct the microphone. Therefore, in this embodiment the zones display screen 1300 is not available for audio incident analysis functions.

In embodiments where directional microphones are used, the zones display screen 1300 may be displayed when audio incident analysis functions are being considered.

Figure 14:
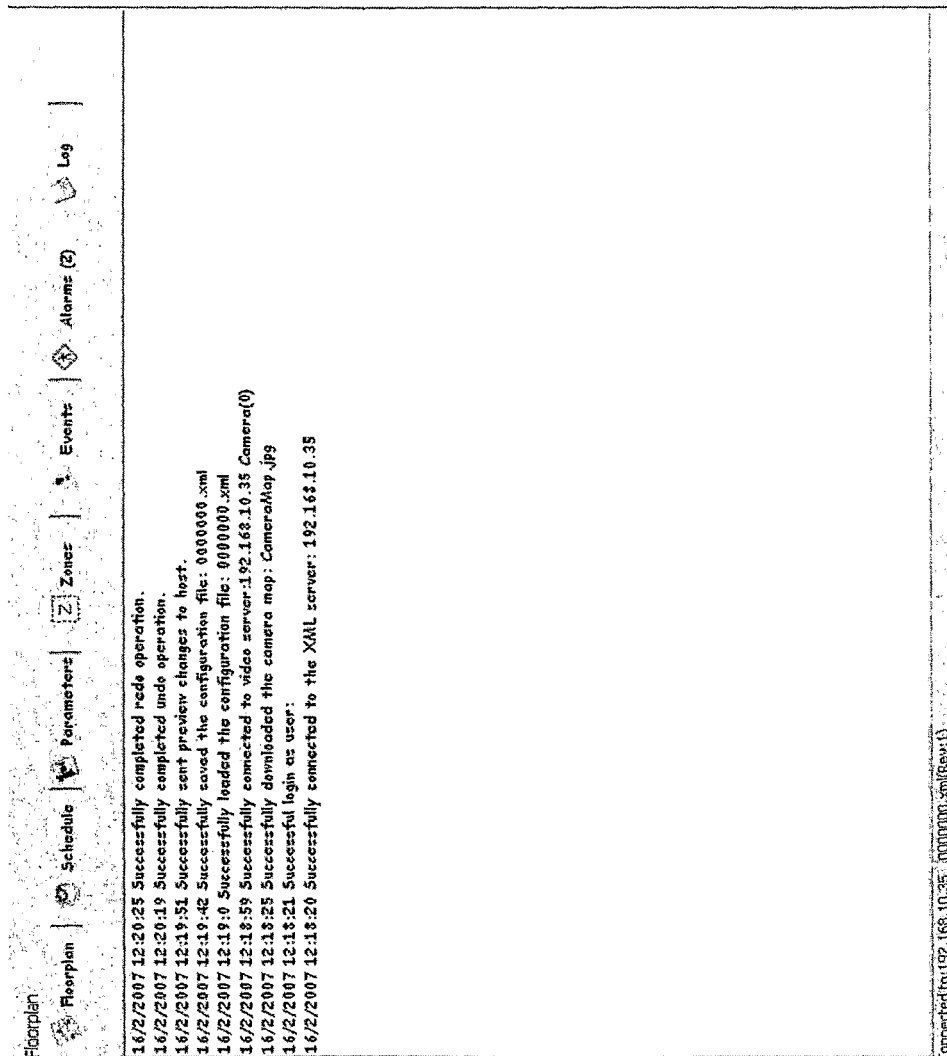

FIG. 14 shows an embodiment of a log display screen 1400 of the CONFIGURE GUI. The log display screen 1400 displays a list of configuration commands that have been executed, and associated timestamp, and an indication as to whether or not the configuration command was performed successfully.

FIGS. 15 and 16 illustrate an embodiment of the MANAGE GUI that enables a user to manage alarms that are generated.

FIG. 15 shows the MANAGE GUI display screen 1500. The MANAGE GUI display screen 1500 comprises a "Map" pane 1502, a "Video" pane 1504, a "Cameras" pane 1506, a "Camera Control" pane 1508, an "Alarm Preview" pane 1510, and an "Alarms" pane 1512. A user can select an icon on the MANAGE GUI display screen 1500 to control which pane is displayed as the large pane in the top left hand corner of the display screen 1500.

The user of the MANAGE GUI can log in to more than one server, and the map pane 1502 is configured to display all of the servers to which the user of the MANAGE GUI is logged in. The map pane 1502 illustrated in FIG. 15 displays six servers 1514 located across the world to which the user is logged in.

In this embodiment, if a server has generated an alarm, the colour of that server icon 1514 changes colour as an identifier to the user that an alarm has been generated.

The user can double click on a server 1514 to display the location of cameras and/or microphones associated with that server. Clicking on a server displays an image which is similar to the floorplan display screen 800 shown in FIG. 8.

Double clicking on a camera icon (such as camera icons 802, 804, 806, 808, 810 in FIG. 8) causes the live video feed from camera to be displayed in the video pane 1504.

FIG. 16 shows an example of the MANAGE GUI display screen 1600 with the video pane 1602 displayed as the main pane. The number of video feeds displayed in the video pane 1602 can be selected by clicking one of the five icons illustrated as 1604.

When the video pane 1602 is in "playback mode" (described below), the icons 1606 can be used to rewind, pause, play, and fast forward the video footage.

The cameras pane 1506 in FIG. 15, displays all of the cameras associated with each server/host to which the user is logged in. In FIG. 15, 5 of the hosts are visible in the cameras pane 1506, and the second and third servers labelled VIH00029 and VIH00019 have been expanded to show the four cameras associated with each server. Double clicking on a camera causes the live video feed from that camera to be displayed in the video pane 1504.

Some embodiments, all microphones associated with each server/host are also displayed in the cameras pane 1506, and it may also be possible to play live audio data by selecting a microphone from the cameras pane 1506. Live audio data may be provided instead of live video data, or as well in addition to live video data.

When an alarm is generated, the corresponding camera/s in the cameras pane 1506 change colour to identify to a user that an alarm has been generated.

When playing back video data, it is possible to export the video data to an external device by selecting an appropriate icon.

The camera control pane 1508 is used to control "Pan Tilt Zoom" (PTZ) cameras, and optionally select preset locations of the PTZ cameras.

The alarms pane 1512 is used to display alarms generated by a server as a row in the alarms pane 1512.

The first element of an alarm displayed in the alarms pane 1512 is the alarm attribute 1516. The alarm attribute can be "T"—true, "F"—false, "I"—ignore, "N"—new, and the value of the alarm attribute can be set by the user clicking the appropriate icon 1518.

When the user clicks the archive icon 1520, the user terminal 108 sends a signal representative of the user selected alarm attribute 1516 for each alarm to the associated server. The server stores a representation of the user selected alarm attribute in memory, and may automatically adjust the alarm configuration in light of the user's selection, or may send a signal representative of the user selection to a user of the CONFIGURE GUI as a means of feedback to a manager of the system so that they can manually adjust the alarm parameters accordingly.

Clicking on an alarm in the alarms pane 1512 causes the associated image (as configured as part of the alarm analysis parameters) to be displayed in the alarm preview pane 1510.

Double clicking on an alarm in the alarms pane 1512 causes the associated video footage (as configured as part of the alarm analysis parameters) to be displayed in the video pane 1504.

When an alarm is generated, a new entry is generated in the alarms pane 1512, the associated camera changes colour in the cameras pane 1506, and the associated video footage (as configured as part of the alarm analysis parameters) is displayed in the video pane 1504.

Figure 17A:
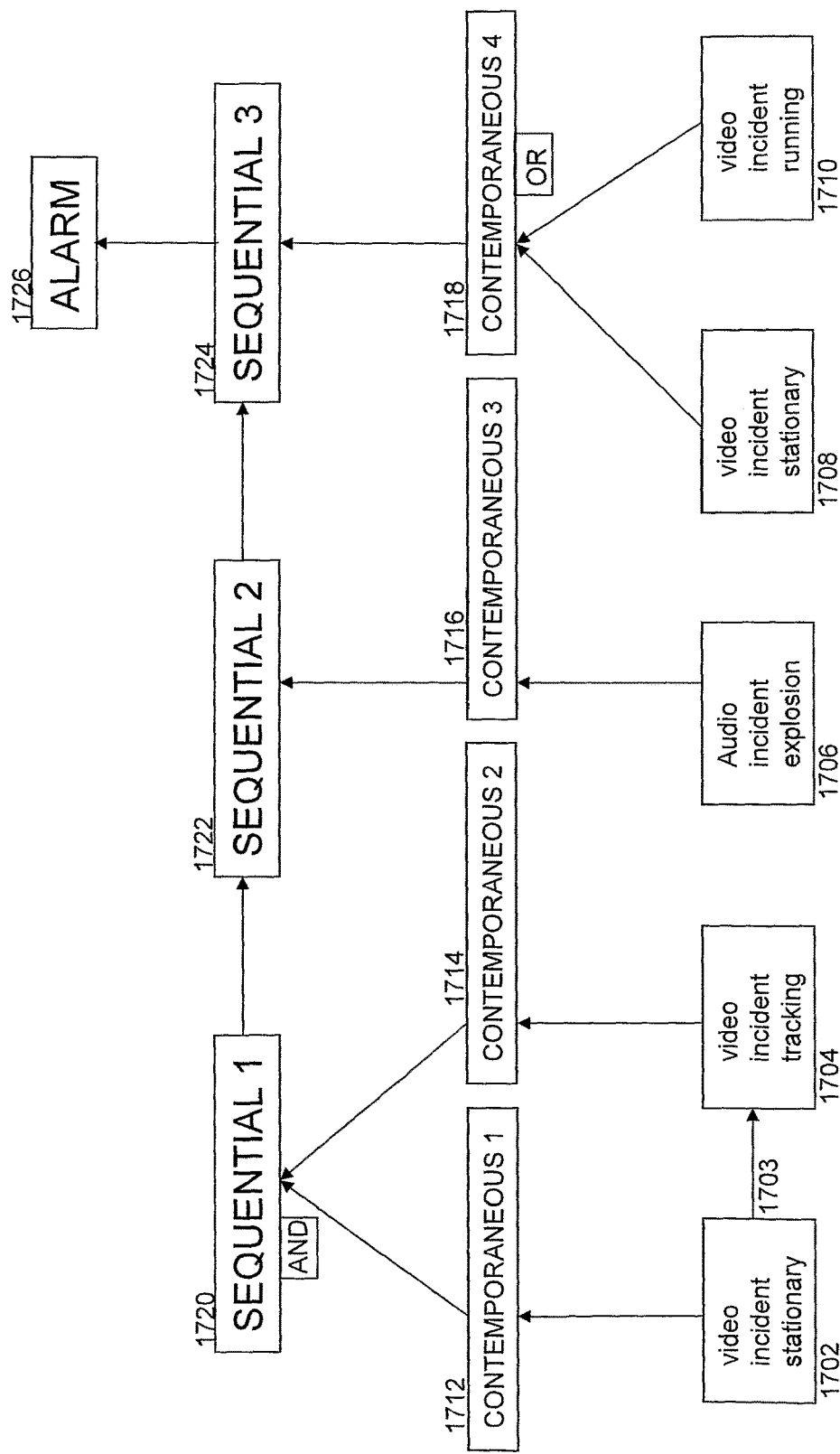
FIG. 17 illustrates an example of the application of analysis functions according to an embodiment of the invention.

FIG. 17*a* illustrates schematically an embodiment of a scenario/sequence of analysis functions that are configured to cause an alarm 1726 to be generated.

Figure 17B:
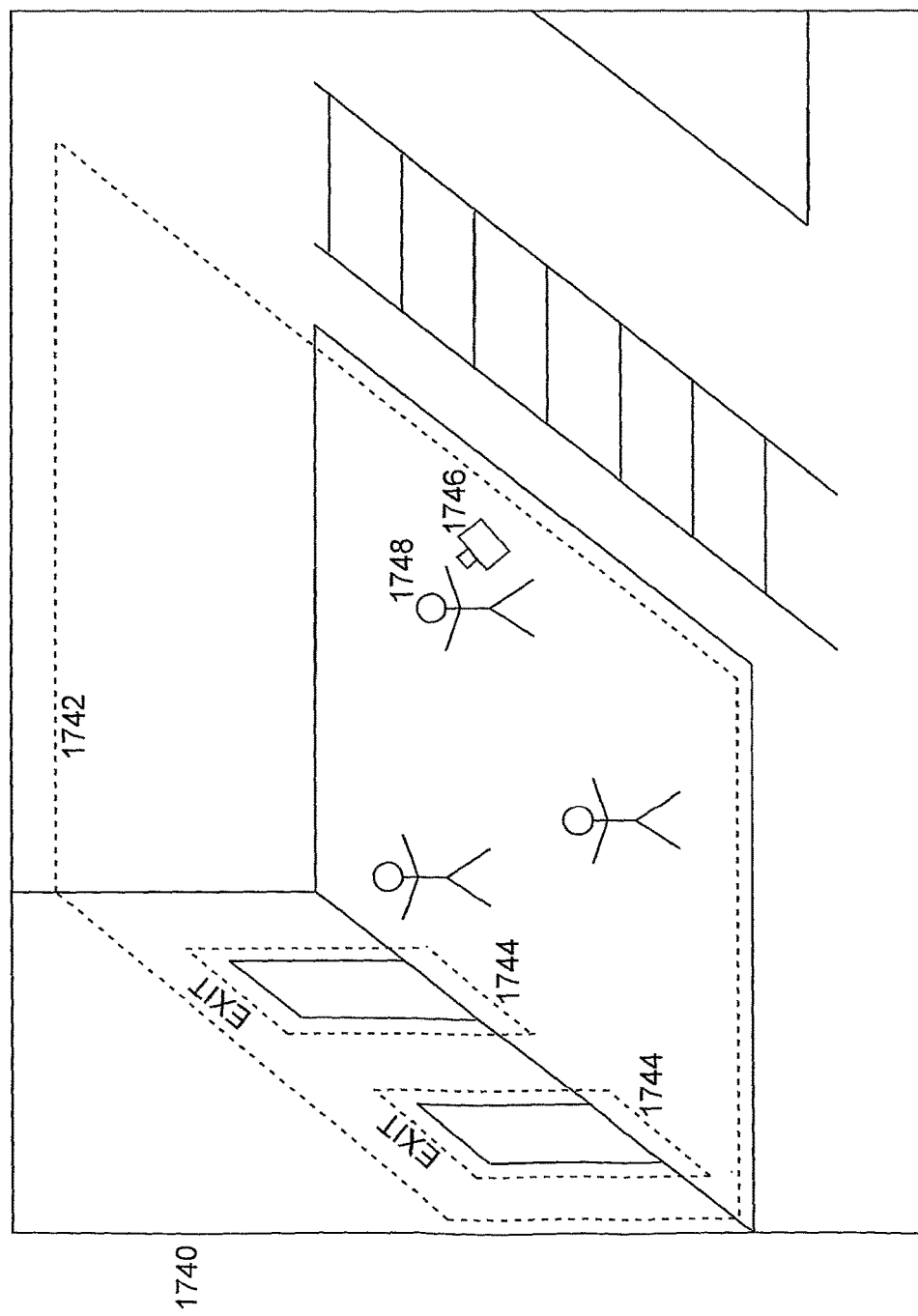

The incident analysis functions 1703, 1704, 1706, 1708, 1710, contemporaneous analysis functions 1712, 1714, 1716, 1718 and sequential analysis functions 1720, 1722, 1724 are illustrated schematically in FIG. 17. FIG. 17*b* illustrates an image/scene 1740 on which the analysis functions illustrated in FIG. 17*a* are performed.

This embodiment illustrates an example which monitors a platform at a train station and generates an alarm when 1) a person leaves a bag on the platform and then leaves the platform themselves, 2) the sound of an explosion is detected, and 3) people are either running or stationary on the platform.

Incident analysis function 1 1702 is a video incident analysis functions that monitors a first detection area 1742 corresponding to the platform in the scene 1740. Incident analysis function 1 1702 is configured to detect a stationary object with a size between "small package" and "large package" in the first detection area 1742, whereby the object is stationary for at least five seconds. An example of a small package 1746 in the first detection area 1742 is shown in the scene 1740 of FIG. 17*b*.

As the output of incident analysis function 1 1702 is the only input to contemporaneous analysis function 1 1712, the output of contemporaneous analysis function 1 1712 is the same as the output of incident analysis function 1 1702.

Incident analysis function 2 1704 is a video incident analysis function which monitors tracking of a pedestrian-sized object from a dynamic zone/detection area which is a subset of the first detection area 1702 to a second detection area defined by detection area 2 1704. The second detection area consists of two sub-areas 1744 of the image 1740 relating to the exits from the platform. In this way, the output of incident analysis function 2 1704 becomes true when a pedestrian is tracked from the stationary bag to an exit of the platform.

The horizontal arrow 1703 from incident analysis function 1 1702 to incident analysis function 2 1704 indicates that the tracking algorithm tracks from a dynamic detection area associated with the identified stationary object to a detection area defined by incident analysis function 2 1704.

The output of incident analysis function 2 1704 is connected as the sole input to contemporaneous analysis function 2 1714.

The output of contemporaneous analysis functions 1 and 2 1712, 1714 are connected as inputs to an "AND" rule defined by sequential analysis function 1 1720 such that the function of sequential analysis function 1 1720 is satisfied when both the bag is stationary on the platform and a person has walked from the left bag to an exit of the platform. Sequential analysis function 1 has a timeout period of two minutes.

Incident analysis function 3 1706 is an audio zone that monitors for the sound of an explosion. If the output of incident analysis function 3 is true, then contemporaneous analysis function 3 1716 will also be true as the output of incident analysis function 3 1706 is the only input to contemporaneous analysis function 3 1716. In turn, sequential analysis function 2 1722 will also be satisfied as long as the output of contemporaneous analysis function 3 becomes true before the expiry of the two minute timeout period defined by sequential analysis function 1 1720. Sequential analysis function 2 1722 has a timeout period of 20 seconds.

Incident analysis function 4 1708 is configured to detect any stationary objects having the size of a pedestrian in the same detection area 1742 as that used by incident analysis function 1 1702.

Incident analysis function 5 1710 is configured to detect any objects having the size of a pedestrian running in the same detection area 1742 as that used by incident analysis function 1 1702.

The output of incident analysis functions 4 and 5 1708, 1710 are provided as inputs to contemporaneous analysis function 4 1718, which is configured to perform an "OR" operation on the inputs. That is, contemporaneous analysis function 4 1718 is configured to determine if either people are stationary on the platform or running on the platform. If this determination is true, then the output of contemporaneous analysis function 4 1718 is true.

The output of contemporaneous analysis function 4 1718 is provided as an input to sequential analysis function 3 1724. Sequential analysis function 3 1724 is the last sequential analysis function in the sequential chain, and the output of sequential analysis function 3 is used to generate the alarm 1726.

The arrangement of the three sequential analysis functions 1720, 1722, 1724 is such that an alarm is generated if a person leaves a bag on the platform and then walks to an exit (sequential analysis function 1 1720), and then within two minutes an explosion sound is determined (sequential analysis function 2 1722), and then within 20 seconds people are either stationary on the platform (which may indicate that they are injured) or are running on the platform (sequential analysis function 3 1724).

It will be appreciated that this example provides an alarm after the event of the explosion has occurred. In other examples, the alarm is generated before the event occurs so that action can be taken in advance. For example, an alarm may be generated immediately after sequential analysis function 1 1720 has been triggered, as this will identify the event that a person has left a bag on the platform and then left the platform. A user who has configured the alarm generation system can define that this event warrants the generation of an alarm.

A similar alarm may be generated for a system that performs surveillance on board a train. For example, if a person leaves a piece of luggage on a train and then leaves the train, an alarm may be generated as a potential bomb threat.

It will be appreciated that the GUIs described in relation to FIGS. 8 to 16 can be adapted to configure external incidents in the same way as video and audio incidents are configured.

Figure 18:
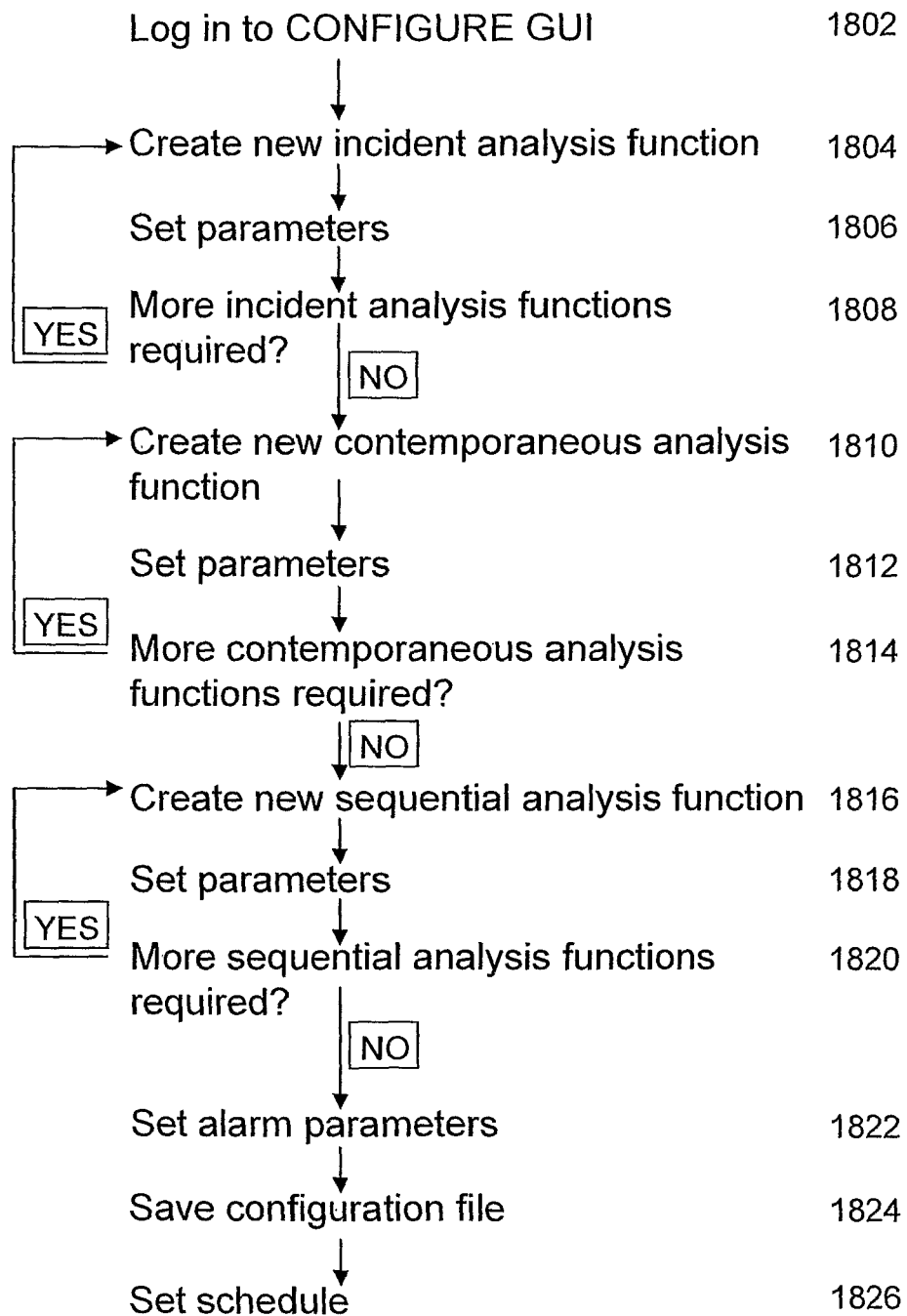
FIG. 18 illustrates a process flow according to an embodiment of the invention.

FIG. 18 illustrates a process flow control diagram showing an embodiment of steps performed when operating a data processing apparatus according to an embodiment of the invention to configure analysis that is to be performed on received data.

At step 1802, the user logs in to the CONFIGURE GUI illustrated in FIGS. 8 to 14.

The user creates a new incident analysis function at step 1804 from the alarms display screen 1100. The user sets the parameters of the new incident analysis function at step

1806, and this includes defining the source of the data that is to be analysed, defining which of the predefined incident analysis functions for that data is forced to apply to the received data, and defining the parameters associated with that incident analysis function.

Setting the parameters for the new incident analysis function at step 1806, may also include defining a detection area to which the analysis function is applied.

If further incident analysis functions are required at step 1808 the process flow returns to step 1804 for the user to create a new incident analysis function. If no further incident analysis functions are required, the process flow moves on to step 1810.

At step 1810, a user creates a new contemporaneous analysis function from the alarms display screen 1100. The user sets the parameters of the new contemporaneous analysis function at step 1812, and this includes defining the inputs to the contemporaneous analysis function, defining the logical operation that should be performed on the inputs, and defining a timer delay for the contemporaneous analysis function.

If further contemporaneous analysis functions are required at step 1814, the process flow returns to step 1810 for the user to create a new contemporaneous analysis function. If no further contemporaneous analysis functions are required, the process flow moves on to step 1816.

At step 1816, a user creates a new sequential analysis function from the alarms display screen 1100. The user sets the parameters of the sequential analysis function at step 1818, and this includes defining the inputs to the sequential analysis function, defining the logical operation that should be performed on the inputs, and defining a timeout period for the sequential analysis function.

If further sequential analysis functions are required at step 1820, the process flow returns to step 1816 for the user to create a new sequential analysis function. If no further sequential analysis functions are required, the process flow moves on to step 1822.

In this example, the data processing apparatus is configured to automatically link the generated sequential analysis functions in the order in which they were created. In other embodiments, the user may define the sequential order that the conditions are evaluated. In addition, in this embodiment the data processing apparatus also automatically links the output of the last sequential analysis function as the input to the alarm.

At step 1822 the user sets the alarm parameters, and these include the alarm playback period, confidence parameters, the alarm interval, the alarm priority, and video overlay zones as discussed above in relation to FIG. 11.

At step 1824, the user saves the configuration file, and sets the times at which the configuration file should be applied using the schedule display screen 900 and step 1826.

It will be appreciated that the example described with regard to FIG. 18 describes the configuration of a single alarm, and that steps 1804 to 1822 can be repeated to configure further alarms and subsequently store the alarms in the same, or different, configuration files at step 1824.

As described above, some incident analysis functions utilise the identification of an object of a certain size, for example a pedestrian, a car, etc, as part of their functionality. In order for an incident analysis function to determine the presence of objects of a certain size, the incident processors 302, 304, 306 illustrated in FIG. 3 is able to use perspective to determine the relative size of an object taking into account whether the object is close to the camera (at the front of the scene) where it will appear larger than if it is far from the camera (at the back of the scene). In this context perspective indicates a field of depth in a two dimensional image.

According to an embodiment of the invention, the CONFIGURE GUI is configured to provide the user with the functionality to automatically define functions that should be applied to detected objects to determine their relative size independent of where they are in the scene.

In this embodiment, this functionality is provided via the parameters display screen 400 illustrated in FIG. 4.

A user can click on the "configure scene perspective" icon 412 to configure the scene perspective which enables the user to define the size of a virtual object relative to objects in the image at two positions in the image 412 displayed on the parameters display screen 400.

In this embodiment, when the user clicks on the "configure scene perspective" icon 412, the user can move the mouse into the confines of the image 412 where the mouse cursor changes to display a "virtual object".

Figure 19:
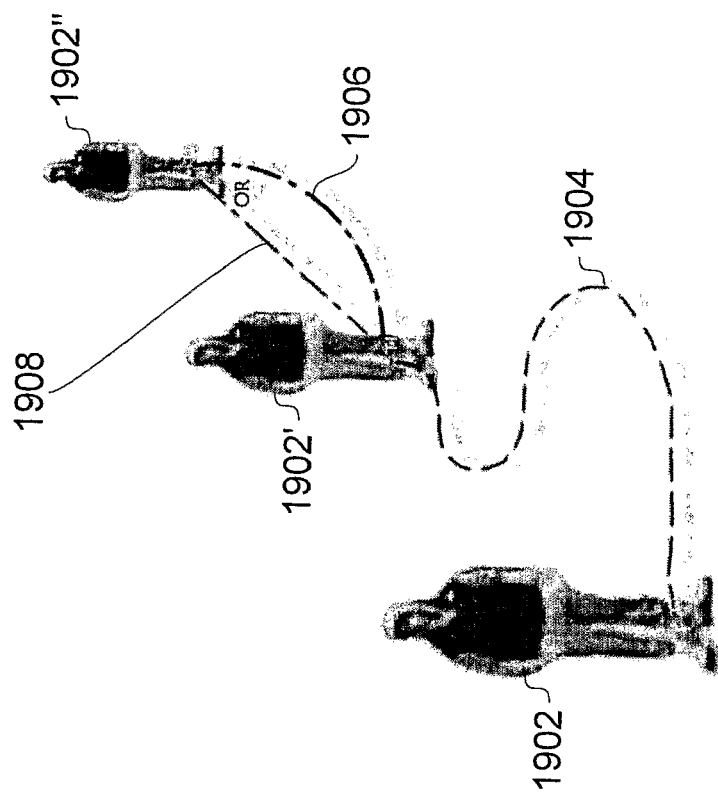
FIG. 19 illustrates a virtual object according to an embodiment of the invention.

An example of a virtual object is illustrated in FIG. 19. The virtual object in FIG. 19 is a virtual person 1902. An advantage of using a virtual person 1902 as the virtual object is that it is convenient for a user to determine the size of a person relative to the scene, for example by comparing the virtual person 1902 to real people that are displayed in the image 1412. Additionally, it may be convenient to determine what should be the relative size of the virtual person 1902 relative to background elements of the scene 412, for example a doorway, or a car.

In other embodiments, the virtual object may be a virtual piece of luggage, a virtual car, or any other object for which a user of the CONFIGURE GUI can define the size relative to the scene.

In this embodiment, when the user clicks the "initialise perspective" button the cursor/virtual object 1902 is clamped to the bottom of the image 412, as this defines the front of the scene. The user can then hold the left mouse button down and move the mouse back and forth (corresponding to up and down movement in the scene) to increase and decrease the size of the virtual object 1902. Once the user is satisfied with the size of the virtual object 1902, they can click the right mouse button to define the size of the virtual object at the front of the scene.

In order for the user to define the size of the virtual object at the back of the scene, the user can hold the left mouse button down and move the mouse to increase and decrease the size of the virtual object 1902 in the same way as the virtual object was resized at the front of the scene. Once the user is satisfied with the size of the virtual object 1902 at the furthest visible point in the scene (that is the horizon or a back wall) relative to objects at the back of the scene, the user can move the cursor/virtual object to the back of the scene and click the left mouse button again within the image 412. Clicking the left mouse button a second time causes the bottom of the cursor/virtual object to be associated with that position in the image 412 as being the furthest visible point in the ground plane.

If the image 412 has a back wall, the user can click the right mouse button so that the back of the scene is defined at the point the back wall meets the ground plane. If the image 412 does not have a back wall, the user can click the mouse button so that the cursor/virtual object is related to the horizon of the scene displayed in the image 412.

The size of the cursor/virtual object adjusted as the cursor/virtual object is moved between the maximum size defined at the front of the scene and the minimum size defined at the back of the scene. As described below, the size of the virtual object at positions intermediate to the front and back of the scene is calculated by interpolation.

In this embodiment, the aspect-ratio of the virtual object is fixed when the virtual object is resized, independent of whether the virtual object is resized automatically or responsive to user input.

If the back of the scene is defined at a position that is below the top of the image 1412 (for example at a back wall), movement of the cursor past that point does not cause the virtual object to be further reduced in size, as any object in this region of the scene is not any further away from the camera than the same object at the back wall. As an example, the object could be a person climbing up the back wall, thereby not moving further from the camera.

In other embodiments, the size of the cursor/virtual object may be further adjusted beyond the extremes defined by the front and back of the scene, in particular if there is no back wall. This may be particularly advantageous as a user can accurately define the size of the virtual object 1902 at a convenient intermediate position in the scene 412 by comparing it to a similar object that is present in the image 412, without the requirement of having to define the size of the object at specific locations.

Figure 20:
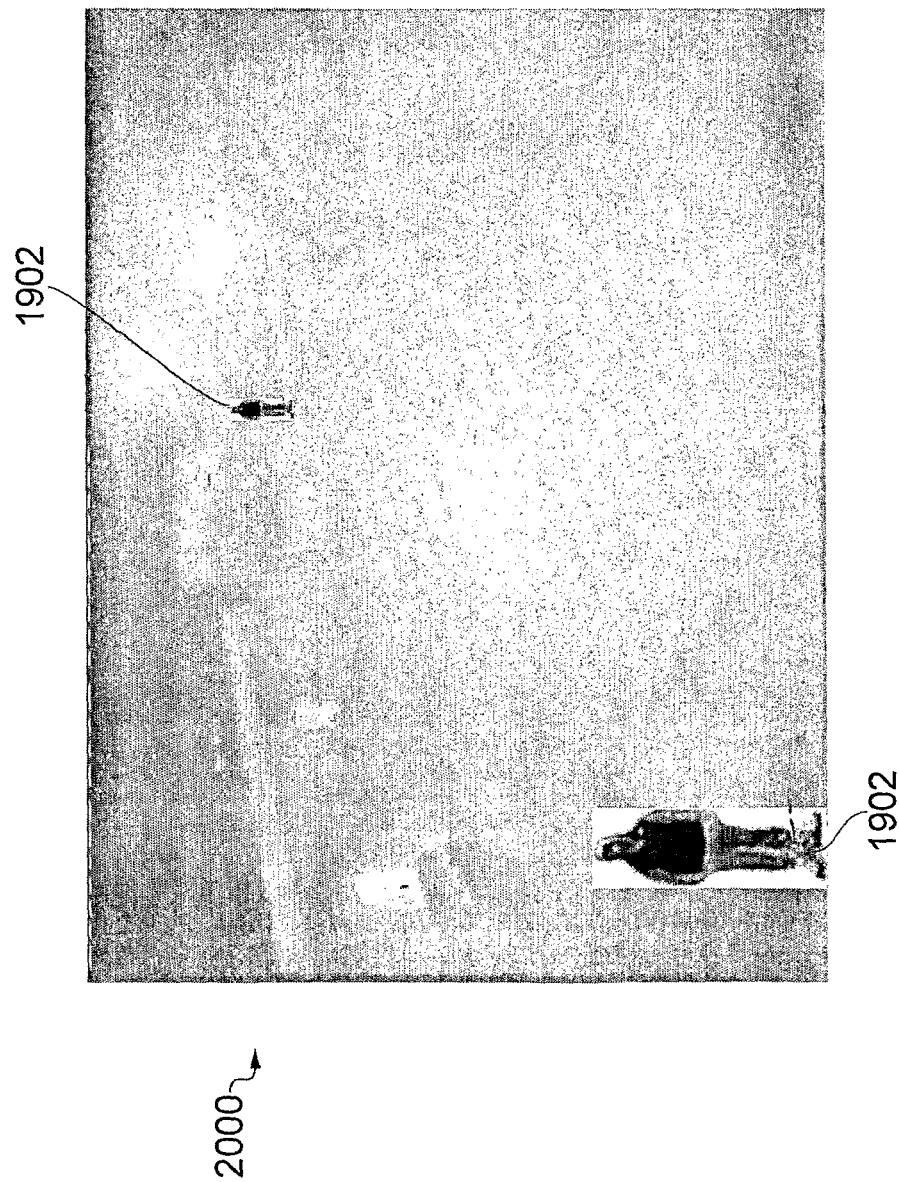
FIG. 20 illustrates a virtual object in a scene according to an embodiment of the invention.

An example of the virtual object 1902 at the front and back of a scene 2000 is illustrated in FIG. 20.

Once the user is satisfied that they have defined the sizes of the virtual object at the front and back of the scene, they can click the save icon 414 on the parameters display screen 400. Clicking the save icon 414 causes parameters representative of the perspective identified by the user's input to be stored as parameters in the configuration file. In this embodiment, the parameters in the configuration file define a vertical coordinate representative of the front of the scene, a vertical coordinate representative of the back of the scene, a value representative of the horizontal and vertical size of the virtual object at the front of the scene, and a value representative of the ratio of the change in size from the front to the back of the scene.

In other embodiments, the user can identify the size of the virtual object at any two points in the image 412 and the system is configured to calculate the relative size at the front of the scene.

When the configuration file is loaded into the video incident processor 302, illustrated in FIG. 3 as described above, the perspective parameters are also loaded into the video incident processors 302.

When an incident analysis function that is enabled on a video incident processor 302 identifies an object, the video incident processor 302 determines the horizontal and vertical size of that object in pixels, and also determines the vertical coordinate in the scene of the lowest vertical part of the object. The lowest vertical coordinate of the object provides the location of the foot of that object, and therefore is representative of the distance from the camera to the object.

The video incident processor 302 then determines the vertical coordinate of the foot of the identified object as a relative position between the front and back of the scene as defined by the vertical coordinates in the perspective parameters.

The video incident processor 302 then applies a weighting function using the value representative of the ratio of the change in size from the front to the back of the scene stored in the perspective parameters to translate the horizontal and vertical size of the identified object in pixels at the identified location in the scene to a horizontal and vertical size in pixels of the corresponding object as if it were at the front of the scene. This provides a standard location at which the size of objects are compared to predefined thresholds.

The video incident processor 302 then divides the horizontal and vertical size of the identified object by the horizontal and vertical size of the virtual object at the front of the scene as determined by the perspective parameters to determine the size of the object as a multiple of the size of the virtual object. For example, a large luggage item may be pre-defined as equivalent to 0.2× the height of the virtual object, and 1.5× the width of the virtual object, where the virtual object 1902 is a person as illustrated in FIG. 19.

An example may comprise the use of a virtual object 1902 of a person as illustrated in FIG. 19, wherein the virtual object is predefined as having a height of 1.6 m. Following the user's calibration using the parameters display screen 400, the perspective parameters stored in the configuration file define the front of the scene as a vertical coordinate of '0', the back of the scene as a vertical coordinate of '500', the vertical size of the virtual object at the front of the scene as '100' pixels, and a ratio of the change in size from the front to the back of the scene as '10' which defines that the size of the virtual object reduces by 10% for every 100 pixels from the front is moved to the back of the scene.

As part of the video incident and processor, the video incident processor 302 identifies an object with a vertical height of 220 pixels and with a lowest point at a vertical coordinate of 100 pixels in the received video data. The video incident processor 302 first translates the size of the identified object to the size of the corresponding object at the front of the scene. In this example, the vertical size of the corresponding object at the front of the scene is 200 pixels (220/1.1). The video incident processor 302 then divides this vertical size by the vertical size of the virtual object at the front of the scene (200/100), and determines that the identified object is equal to the height of two virtual objects. In this example, an object with a height of two virtual objects may be identified as a lorry.

Although this example only relates to the height of an object in order to aid clarity, it will be appreciated that corresponding algorithms/transformations are applied to the width of an object in order to classify an identified object into a class such as a lorry, car, pedestrian, etc.

It should be appreciated that this is one example, and that other functions may be used.

In this embodiment, the video incident processor 302 assumes that the ground plane is linear. However, in other embodiments, discontinuities in the ground plane such as steps, inclines, declines, both in the horizontal and vertical directions, may be accounted for when translating the size of the object from its identified position to an arbitrary position at the front of the scene.

A further embodiment can enable a virtual object 1902 to be used as a test mechanism to determine whether or not alarms are being generated correctly. In one embodiment, this functionality is provided by the zones display screen 1300 illustrated in FIG. 13.

This is particularly advantageous as embodiments of the invention provide high flexibility/configurability to identify complex scenarios/behaviour, and use of one or more virtual objects 1902 can allow for such complex behaviours to be simulated.

Difficulties exist in the prior art to simulate some events/behaviours, particularly events that occur rarely. Such events can be difficult or dangerous for actors to perform in front of the camera to test the configuration of analysis that is performed on the received data. Examples of events that are difficult to simulate in the real world, but that can be more easily simulated using virtual objects include a person being run over by a car, a car crash, a person jumping out of a moving vehicle, etc.

The virtual object that is used for the testing can either be captured from the scene, for example by drawing around an object in an image with a mouse, and selecting that object as the virtual object, or can be selected from a predefined library of virtual objects which are stored in memory on the server 200.

In one embodiment, a user can initiate a test routine by selecting an appropriate icon from the zones display screen 1300. Initiating a test routine causes the user controlled cursor to be replaced with the selected virtual object, such that the user can move the virtual object around the scene to determine if alarms are generated as expected, for example when the user controls the virtual object to enter or leave a detection area.

As the virtual object is moved around the scene, the user terminal 108 automatically sends an XML message representative of the position of the virtual object to the server 200. A virtual test software module stored in memory 218 on the server 200 is configured to be run by the server processor 204. The virtual test software module sends an identifier of the virtual object and the coordinates of the virtual object to the video processor 302 prior to the application of incident analysis functions for each frame, and the video processor 302 is configured to superimpose onto the received video data a scaled image of the virtual object dependent according to the perspective weight at that position in the scene as defined by the perspective calibration routine described above.

Another embodiment of the invention is illustrated in FIG. 19. In the embodiment of FIG. 19, a user can define key points of the position of the virtual object at an associated time to generate an animation of the virtual object 1902 that can be applied to video data. In the example illustrated in FIG. 19, three key points are defined. At a first key point the virtual object is at position 1902 at time T0, at a second key point, the virtual object is at position 1902' at time T1, and at a third key point, the virtual object is at position 1902" at time T3.

A user may define the movement of the virtual object 1902 between the key points, for example by the route indicated by dashed line 1904 or by one of the routes defined by dashed lines 1906, 1908. The route defined by dashed line 1904 has been configured as a point to point movement where in the route is defined by nice controlled movement between the key points, which are used to define the start and end time of the motion. Alternatively, the route indicated by dashed lines 1906, 1908 define point to point movement with a defined path, with defined times for each point. Route 1906 illustrates a curved route, whereas route 1908 illustrates a direct route. Parameters may be provided to control the acceleration/deceleration of the virtual object 1902.

In some embodiments, the virtual object may be considered as a sprite.

Figure 21:
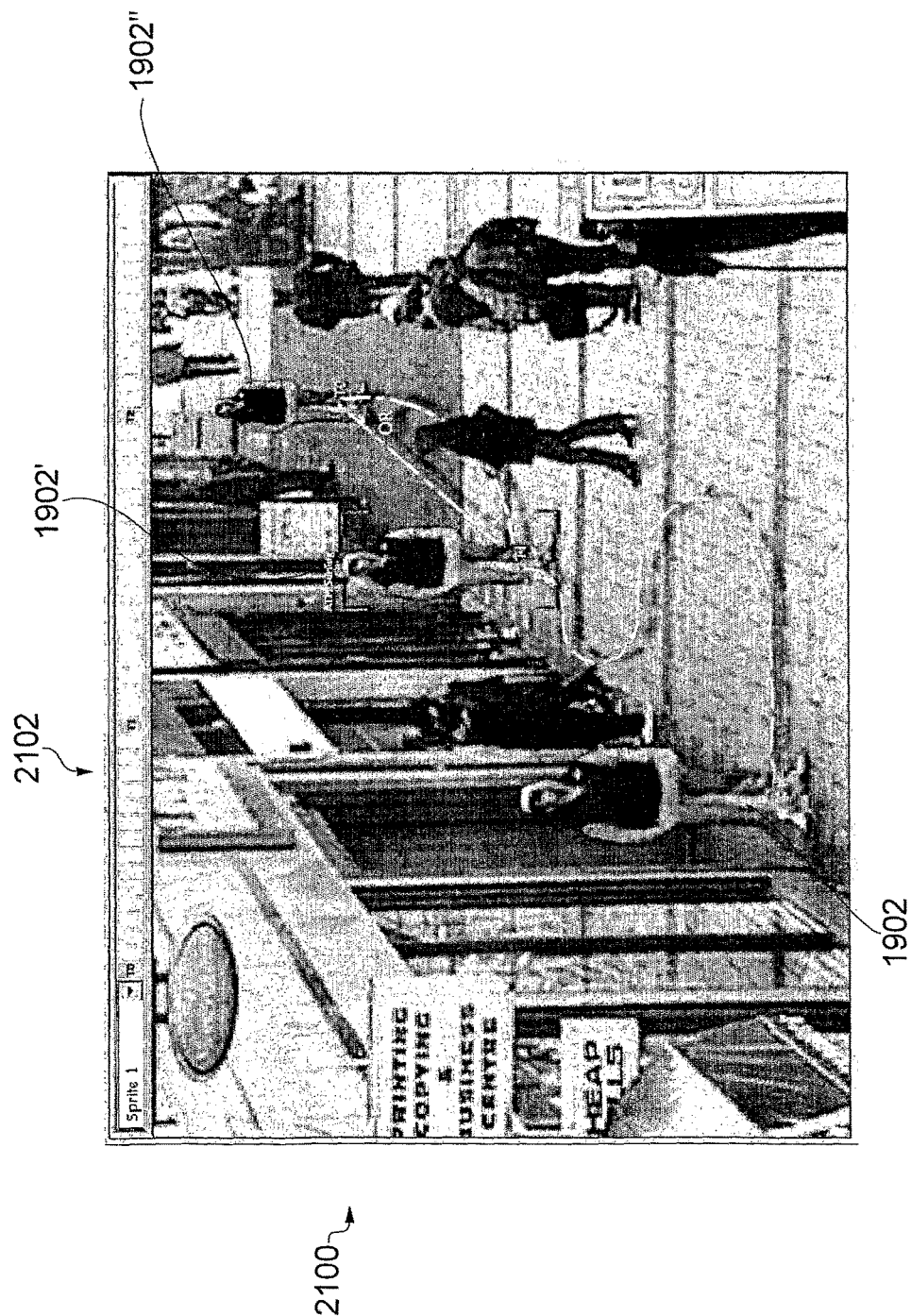
FIG. 21 illustrates an embodiment of a testing display screen according to an embodiment of the invention.

FIG. 21 illustrates the application of the animation of a virtual object 1902 as illustrated in FIG. 19. The motion of the virtual object 1902 is overlaid on video data to simulate an alarm representative of ATM surfing—that is a person loitering near an ATM.

FIG. 21 illustrates a timeline 2102 at the top of the image 2100 that enables a user to configure the times that the virtual object is located at the keypoints 1902, 1902', 1902" as discussed above in relation to FIG. 19.

In some embodiments, the animation may be played once, and on other embodiments the animation may be repeated, possibly indefinitely until a user selects an option to indicate that the testing is finished.

In some embodiments, the CONFIGURE GUI is configured to provide the functionality for a user to select video footage to be recorded and stored in memory 218 on the server 200. To provide a test scenario, the user can then select that they want to apply a test routine to the recorded data, and the server 200 is configured to provide the stored video data to the video processor 302 in place of video data received from a camera. The user can then configure test alarm scenarios to apply to the recorded video data. The recorded video data may played back in a loop.

In addition, in some embodiments, the server 200 may be configured to play back the recorded video data and enable a user to overlay one or more virtual objects on top of the recoded video data as described above.

An advantage to recording video data is that actors could perform desired behaviours in a scene that is being recorded, and the recorded video footage can then be played back for testing.

In some embodiments, a user can search recorded video storage for such scenarios naturally performed by people and/or vehicles in a scene, and choose to play back and use the video footage for testing a configuration.

An example of a complex testing operation that can be performed according to embodiments of the invention is one that identifies a person jumping out of a moving vehicle. The testing operation can use pre-recorded video footage of cars driving through a street in combination with a virtual figure that originates from a moving vehicle and moves away from the vehicle at predetermined times. Use of this overlayed video footage can allow testing of analysis parameters to be applied to video footage without the requirement of having existing footage of a person jumping out of a moving vehicle.

In one example, the data processing apparatus according to the invention may be an edge device located in a node room which is geographically close to the area that is to be monitored. An advantage of using an edge device is that it is a low power unit which is rugged and can operate in high temperature (for example 50° C.). Furthermore, an edge device is small which enables it to conveniently fit in close proximity to remote areas such as in cabinets on the street for surveillance of public places. In addition, an edge device is well suited to be remotely configured and is capable of communicating via IP for both video streaming and communication of alarm messages.

Figure 22:
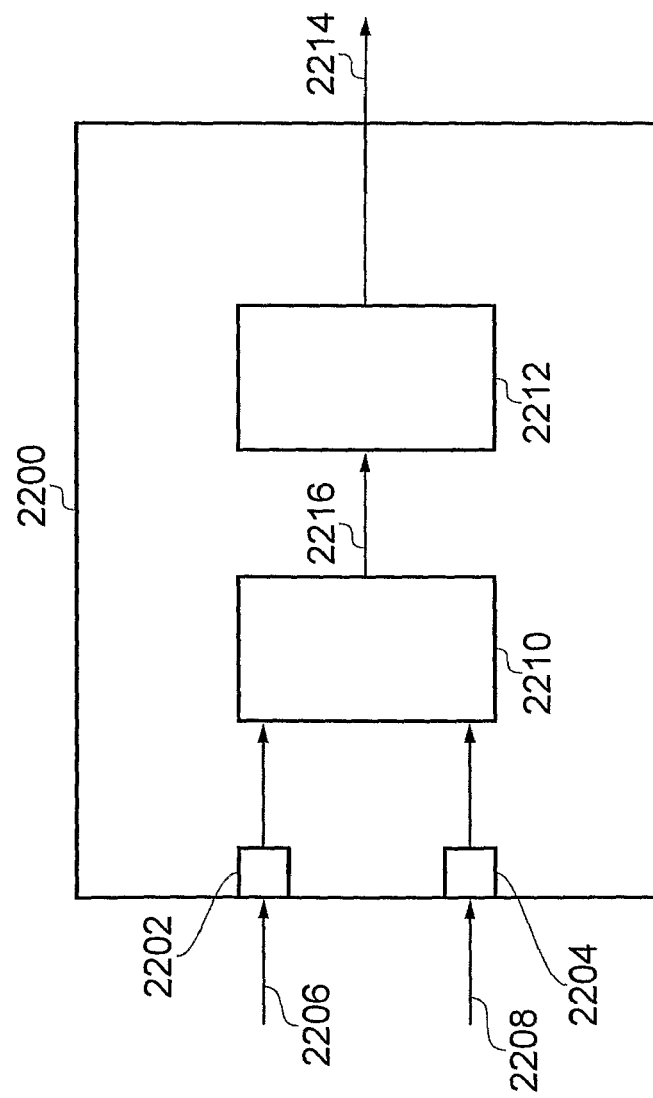
FIG. 22 illustrates an embodiment of data processing apparatus according to an embodiment of the invention.

FIG. 22 illustrates another embodiment of data processing apparatus 2200 according to an embodiment of the invention.

The data processing apparatus 2200 comprises a video data receiver 2202, a virtual test signal receiver 2204, a video overlay engine 2210 and an alarm engine 2212.

The video data receiver 2202 is configured to receive video data 2206, and the virtual test signal receiver 2204 is configured to receive a virtual test signal representative of a location of a virtual object.

In this embodiment, the received video data comprises a sequence of JPEG images, and the virtual test signal comprises an XML message that identifies the location of a virtual object by means of coordinates that identify the position of the virtual object relative to the JPEG image.

The video overlay engine 2210 is configured to overlay the received video data 2206 with a virtual object at locations determined from the virtual test signal 2208 to generate virtual test video data 2216. In this embodiment, the video overlay engine 2210 has a graphical representation of the virtual object pre-stored in memory, although in other embodiments, the received virtual test signal 2208 may provide the graphical representation of the virtual object.

The alarm engine 2212 is configured to analyse the virtual test video data 2216 and generate an alarm signal 2214 based on an output signal generated by the analysis.

In this embodiment, the video overlay engine 2210 is configured to adjust the size of the virtual object dependent upon the objects location in the JPEG image. That is, the field of depth of the image is taken into account when adjusting the size of the virtual object, as described above.

In an embodiment of the invention where the video overlay engine 2210 and alarm engine 2212 are provided on the server 200 illustrated in FIG. 3, the video overlay engine 2210 is provided on the video incident processor 302, and the functionality of the alarm engine 2212 is split between the incident analysis functions stored in video incident processor 302 and the contemporaneous and sequential analysis functions stored in logic unit 308.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, suchs as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

The present application relates to a data processing apparatus comprising a video data receiver configured to receive video data, an audio data receiver configured to receive audio data, and an alarm engine configured to perform sequential analysis of said received video and audio data to determine a sequence of one or more incidents and generate an alarm signal based on an output signal generated by said sequential analysis. The alarm engine is configured to generate a sequential analysis output signal.

The sequential analysis comprises the sequential application of one or more sequential analysis functions to the received audio and video data and the sequential analysis output signal comprises a representation of the result of the last of the one or more sequential analysis functions. The sequential analysis can comprise a plurality of sequential analysis functions, in which one or more of the plurality of sequential analysis functions, comprises a sequential analysis rule and a timeout period.

In various implementations of these embodiments: 1) the timeout period defines a period of time after the sequential analysis rule has been satisfied during which the output signal for that sequential analysis function is maintained true; 2) the timeout period for the sequential analysis function is applied from the time at which the sequential analysis rule of that sequential analysis function is satisfied; and/or 3) one or more of the sequential analysis rules comprises an operation that is performed on a contemporaneous analysis output signal.

The alarm engine can be configured to perform contemporaneous analysis on said received audio and video data, and generate a contemporaneous analysis output signal. The contemporaneous analysis output signal comprises a representation of the result of one or more contemporaneous analysis functions applied either directly or indirectly to the received audio and video data. The contemporaneous analysis may comprise one or more contemporaneous analysis functions, which comprise a contemporaneous analysis rule and a delay period. In one implementation of this embodiment, the contemporaneous analysis rule comprises an operation that is performed on one or more incident analysis output signals.

In another implementation of this latter embodiment, the alarm engine is configured to perform incident analysis on said received audio and video data, and generate an incident analysis output signal. The incident analysis output signal comprises a representation of the result of one or more pattern recognition operations performed on said received audio and/or video data. In one implementation of this embodiment, the one or more pattern recognition operations comprise identifying one or more objects from the video data. The incident analysis may comprise performing one or more pattern recognition operations on the one or more objects identified from the video data.

In embodiments of the embodiments of the last paragraph, the incident analysis is performed on the video data is performed on a detection area that comprises a sub-area of said video data. The detection area can be defined based on a result of one or more pattern recognition operations performed on received audio and/or video data.

The video data can be data representative of output signals generated by a plurality of cameras. The audio data can be data representative of output signals generated by a plurality of microphones. The audio data can be representative of sound emanating from outside of the field of the received video data. The data processing apparatus may comprise an external data receiver configured to receive external data. In this case, the alarm engine is also configured to perform analysis on said received external data.

The data processing apparatus is substantially as hereinbefore described and illustrated in the accompanying drawings.

A system comprising one or more embodiments of the data processing apparatus described in the last eight paragraphs, includes a camera configured to generate video data and a microphone configured to generate audio data. The system can further comprise a user terminal in electronic communication with the data processing apparatus. A computer program comprising machine or computer-readable program elements configures embodiments of data processing apparatuses described in the last eight paragraphs. A carrier medium carries a computer program to configure embodiments of the data processing apparatuses described in the last eight paragraphs. In one implementation of this embodiment, the carrier medium is a one of the following: solid-state memory; magnetic memory; CD-ROM; digital versatile disk (DVD); HD-DVD; read-write CD; Blu-ray Disk, an electronic signal; radio frequency carrier wave or optical carrier wave.

The present application relates to a method of operating a data processing apparatus comprising receiving video data, receiving audio data, performing sequential analysis of said received video and audio data to determine a sequence of one or more incidents, and generating an alarm signal based on an output signal generated by said analysis. The performing sequential analysis of the received audio and video data can comprise sequentially applying one or more sequential analysis functions to the received audio and video data, and generating a sequential analysis output signal. The sequential analysis output signal comprises a representation of the result of the last of the one or more sequential analysis functions. The performing sequential analysis may comprise sequentially applying a plurality of sequential analysis functions to the received audio and video data. In this case, applying one or more of the plurality of sequential analysis functions comprises applying a sequential analysis rule and a timeout period.

The method of operating a data processing apparatus may also include maintaining the output of a sequential analysis function as true for the period of time defined by the timeout period after the sequential analysis rule is satisfied. In one implementation of this latter embodiment, the method includes applying the timeout period for the sequential analysis function from the time at which the sequential analysis rule of that sequential analysis function is first satisfied. Embodiments of the method may further comprise applying the sequential analysis rule to a contemporaneous analysis output signal.

In some embodiments, analysing said received video and audio data comprises performing contemporaneous analysis on said received audio and video data, and generating a contemporaneous analysis output signal. The contemporaneous analysis output signal comprises a representation of the result of one or more contemporaneous analysis functions applied either directly or indirectly to the received audio and video data. Performing contemporaneous analysis may comprise applying a contemporaneous analysis rule and a delay period to the received audio and video data. The contemporaneous analysis rule may be applied to one or more incident analysis output signals.

In another implementation of this embodiment, analysing said received video and audio data comprises performing incident analysis on said received video and audio data, and generating an incident analysis output signal. The incident analysis output signal comprises a representation of the result of one or more pattern recognition operations performed on said received audio and/or video data. The one or more pattern recognition operations may comprise identifying one or more objects from the video data. The performing incident analysis on said received video and audio data may comprise performing one or more pattern recognition operations on the one or more objects identified from the video data.

Embodiments of the method of analysing said received video and audio data may also comprise performing incident analysis on a detection area that comprises a sub-area of said video data. The detection area can be defined based on a result of one or more pattern recognition operations performed on received audio and/or video data. The video data can be representative of output signals generated by a plurality of cameras. The audio data can be data representative of output signals generated by a plurality of microphones. The audio data can be representative of sound emanating from outside of the field of the received video data.

The embodiments of the method of operating a data processing apparatus may also include receiving external data. In this case, the step of analysing said received video and audio data further comprises analysing the received external data, and generating the alarm signal based on the output signal generated by said analysis of received video, audio, and external data.

The method of operating a data processing apparatus is substantially as hereinbefore described and illustrated in the accompanying drawings.

The present application relates to a method of configuring data processing apparatus for automatically determining a real size of an object in an image of a scene displayed on a display screen. The method comprises responding to user input by displaying in an image of a scene displayed on a display screen a virtual object representative of a real size object to establish a first datum position, varying the size of the virtual object in the image responsive to user input, storing data representative of the horizontal and vertical size of the virtual object relative to the displayed image at the first datum position, displaying said virtual object at a second datum position in said image responsive to user input, varying the size of the virtual object on the display screen at the second datum position responsive to user input, and storing data representative of the vertical and horizontal size of the virtual object at the second datum position relative to the displayed image. The method of configuring data processing apparatus for automatically determining a real size of an object in an image of a scene displayed on a display screen may also comprise automatically establishing the first datum position by displaying the virtual object such that the foot of the virtual object is at the foot of the displayed image.

The embodiments of the method of configuring data processing apparatus for automatically determining a real size of an object in an image of a scene displayed on a display screen may also comprise automatically establishing said second datum position by displaying said virtual object such that the foot of the virtual object is on the horizon of the scene in the displayed image. The method of configuring data processing apparatus for automatically determining a real size of an object in an image of a scene displayed on a display screen may also comprise storing data representative of the real size represented by said virtual object.

The present application relates to a computer program comprising machine or computer-readable program elements for configuring a data processing apparatus to generate control signals for implementing embodiments of the methods of operating and/or configuring the data processing apparatus described in the last nine paragraphs. A carrier medium carries the computer program. The carrier medium can be one of the following: solid-state memory; magnetic memory; CD-ROM; digital versatile disk (DVD); HD-DVD; read-write CD; Blu-ray Disk, an electronic signal; radio frequency carrier wave or optical carrier wave.

The present application relates to a data processing apparatus configured for automatically determining a real size of an object in an image of a scene displayed on a display screen. The apparatus is operative to respond to user input by displaying in an image of a scene displayed on a display screen a virtual object representative of a real size object to establish a first datum position; vary the size of the virtual object in the image responsive to user input; store data representative of the horizontal and vertical size of the virtual object relative to the displayed image at the first datum position; display said virtual object at a second datum position in said image responsive to user input; vary the size of the virtual object on the display screen at the second datum position responsive to user input; and store data representative of the vertical and horizontal size of the virtual object at the second datum position relative to the displayed image.

The apparatus may be further operative to automatically establish said first datum position by displaying said virtual object such that the foot of the virtual object is at the foot of said displayed image. The apparatus may be further operative to automatically establish said second datum position by displaying said virtual object such that the foot of the virtual object is on the horizon of the scene in the displayed image. The apparatus may be further operative to store data representative of the real size represented by said virtual object.

The present application relates to a data processing apparatus comprising a video data receiver configured to receive video data; a virtual test signal receiver configured to receive a virtual test signal representative of a location of a virtual object; a video overlay engine configured to overlay the received video data with a virtual object at locations determined from the virtual test signal to generate virtual test video data; and an alarm engine configured to analyse the virtual test video data and generate an alarm signal based on an output signal generated by said analysis. The video overlay engine may be configured to set the size of the virtual object dependent upon the location of the virtual object. The received video data can be pre-recorded video data retrieved from computer memory. In another implementation of this embodiment, the virtual object is representative of an object that has been captured from video data. The data processing may further comprise an audio data receiver and/or an external data receiver configured to receive audio data and/or external data. In such cases, the alarm engine is further configured to analyse the received audio data and/or external data to generate the alarm signal.

A system comprising one or more embodiments of the data processing apparatus described in the last three paragraphs, includes a camera configured to generate video data and a microphone configured to generate audio data. The system can further comprise a user terminal in electronic communication with the data processing apparatus.

A computer program comprising machine or computer-readable program elements configures embodiments of data processing apparatuses described in the last three paragraphs, said embodiments configured to automatically determine a real size of an object in an image of a scene displayed on a display screen. A carrier medium carries a computer program to configure embodiments of the data processing apparatuses described in the last three paragraphs. In one implementation of this embodiment, the carrier medium is a one of the following: solid-state memory; magnetic memory; CD-ROM; digital versatile disk (DVD); HD-DVD; read-write CD; Blu-ray Disk, an electronic signal; radio frequency carrier wave or optical carrier wave.

The present application relates to a method of operating a data processing apparatus comprising receiving video data; receiving a virtual test signal representative of a location of a virtual object; overlaying the received video data with a virtual object at locations determined from the virtual test signal to generate virtual test video data; and analysing the virtual test video data and generating an alarm signal based on an output signal generated by said analysis.

The method of operating the data processing apparatus may comprise setting the size of the virtual object dependent upon the location of the virtual object before overlaying the received video data with the virtual object. The received video data can be pre-recorded video data retrieved from computer memory. The virtual object can be representative of an object that has been captured from video data. The method of operating a data processing apparatus may further comprise receiving audio data and/or external data. In this latter embodiment, analysing the virtual test video data further comprises analysing the received audio data and/or external data and generating an alarm signal based on an output signal generated by said analysis.

The present application relates to a computer program comprising machine or computer-readable program elements for configuring a data processing apparatus to generate control signals for implementing embodiments of the methods of operating the data processing apparatus described in the last two paragraphs. A carrier medium carries the computer program. The carrier medium can be one of the following: solid-state memory; magnetic memory; CD-ROM; digital versatile disk (DVD); HD-DVD; read-write CD; Blu-ray Disk, an electronic signal; radio frequency carrier wave or optical carrier wave.

The present application relates to data processing apparatus comprising a video data receiver configured to receive video data; an external data receiver configured to receive external data; and an alarm engine configured to analyse said received video and external data and generate an alarm signal based on an output signal generated by said analysis. The alarm engine can be configured to perform sequential analysis of said received video and external data to determine a sequence of one or more incidents. The analysis of received video and external data can be configured to compare a count of objects represented by the video data with a count of objects represented by the external data. The external data can be representative of data output by an RFID system.

A computer program comprising machine or computer-readable program elements configures embodiments of the data processing apparatus described in the last paragraph. A carrier medium carries a computer program to configure a data processing apparatus to generate control signals to configure a data processing apparatus described in the last paragraph. In one implementation of this embodiment, the carrier medium is a one of the following: solid-state memory; magnetic memory; CD-ROM; digital versatile disk (DVD); HD-DVD; read-write CD; Blu-ray Disk, an electronic signal; radio frequency carrier wave or optical carrier wave.

What is claimed is:

1. A method of testing an operation of a data processing apparatus configured for generating an alarm signal as a result of analysis of video data signals, the method comprising:

simulating one or more conditions in a scene by:
  receiving video data representing the scene;
  receiving a virtual test signal representative of one or more locations of a virtual object in said scene;
  setting data representing a horizontal size and a vertical size of the virtual object dependent upon said one or more locations of the virtual object in said scene; and
  overlaying the received video data with an image of the virtual object at said one or more locations determined from the virtual test signal to generate virtual test video data;
analysing the virtual test video data and generating an alarm signal based on an output signal generated by said analysis;
responding to user input to display in an image of a scene displayed on a display screen the virtual object representative of a real size object to establish a first datum position and to store data defining the first datum position;
varying a size of the virtual object in the image responsive to the user input;
storing the data representative of the horizontal size and the vertical size of the virtual object relative to the displayed image at the first datum position;
displaying said virtual object at a second datum position in said image responsive to the user input and to store data defining the second datum position;
varying the size of the virtual object on the display screen at the second datum position responsive to user input; and
storing data representative of the vertical size and the horizontal size of the virtual object at the second datum position relative to the displayed image.

2. The method of claim 1, wherein the received video data is pre-recorded video data retrieved from computer memory.

3. The method of claim 1, wherein the virtual object is representative of an object that has been captured from the video data.

4. The method of claim 1, further comprising receiving at least one of audio data and external data, and wherein analysing the virtual test video data further comprises analysing the received at least one of audio data and external data and generating the alarm signal based on the output signal generated by said analysis.

5. Data processing apparatus, for generating an alarm signal as a result of analysis of video data signals comprising:
  (a) a video data receiver configured to receive video data;
  (b) a module for testing the operation of said apparatus by simulating one or more conditions in a scene, said module comprising:
    (i) a virtual test signal receiver configured to receive a virtual test signal representative of one or more locations of a virtual object in said scene; and
    (ii) a video overlay engine configured to overlay the received video data with the virtual object at said one or more locations determined from the virtual test signal to generate virtual test video data, wherein the video overlay engine is configured to set data representative of a horizontal size and a vertical size of the virtual object dependent upon the location of the virtual object; and
  (c) an alarm engine configured to analyse the virtual test video data and generate an alarm signal based on an output signal generated by said analysis, wherein the data processing apparatus is operative to:

respond to user input by displaying in an image of a scene displayed on a display screen the virtual object representative of a real size object to establish a first datum position and to store data defining the first datum position;
vary a size of the virtual object in the image responsive to the user input;
store data representative of the horizontal size and the vertical size of the virtual object relative to the displayed image at the first datum position;
display said virtual object at a second datum position in said image responsive to the user input and to store data defining the second datum position;
vary the size of the virtual object on the display screen at the second datum position responsive to the user input; and
store data representative of the vertical size and the horizontal size of the virtual object at the second datum position relative to the displayed image.

6. The data processing apparatus of claim 5, wherein the received video data is pre-recorded video data retrieved from computer memory.

7. The data processing apparatus of claim 5, wherein the virtual object is representative of an object that has been captured from the video data.

8. The data processing apparatus of claim 5, further comprising at least one of an audio data receiver and an external data receiver configured to receive at least one of audio data and external data, respectively, and wherein the alarm engine is further configured to analyse at least one of the received audio data and external data, respectively, to generate the alarm signal.

9. A non-transitory carrier carrying a computer program comprising non-transitory processor-implementable instructions for causing a computer to perform a method of testing an operation of a data processing apparatus configured for generating an alarm as a result of analysis of video data signals, said instruction being executable to cause the data processing apparatus to perform the steps of:
  receiving video data representing a scene;
  receiving a virtual test signal representative of one or more locations of a virtual object in said scene;
  setting data representing a horizontal size and a vertical size of the virtual object dependent upon said one or more locations of the virtual object in said scene;
  overlaying the received video data with an image of the virtual object at said one or more locations determined from the virtual test signal to generate virtual test video data;
  analysing the virtual test video data and generating an alarm signal based on an output signal generated by said analysis;
  responding to user input to display in an image of a scene displayed on a display screen the virtual object representative of a real size object to establish a first datum position and to store data defining the first datum position;
  varying a size of the virtual object in the image responsive to the user input;
  storing data representative of the horizontal size and the vertical size of the virtual object relative to the displayed image at the first datum position;
  displaying said virtual object at a second datum position in said image responsive to the user input and to store data defining the second datum position;

varying the size of the virtual object on the display screen at the second datum position responsive to the user input; and storing data representative of the vertical size and the horizontal size of the virtual object at the second datum position relative to the displayed image.

10. The non-transitory carrier of claim 9, wherein the received video data is pre-recorded video data retrieved from a computer memory.

11. The non-transitory carrier of claim 9, wherein the virtual object is representative of an object that has been captured from the video data.

12. The non-transitory carrier of claim 9, wherein the program further comprises instructions for causing the computer to perform the method further comprising receiving at least one audio data and external data, and wherein analysing the virtual test video data further comprises analyzing the received at least one of audio data and external data, respectively, and generating an alarm signal based on an output signal generated by said analysis.

* * * * *